United States Patent
Shim et al.

(10) Patent No.: US 7,509,149 B2
(45) Date of Patent: Mar. 24, 2009

(54) METHOD AND APPARATUS FOR CHANGING A SOUND SOURCE OF A SUPPLEMENTARY SERVICE USING A RING BACK TONE ON CALLING

(75) Inventors: Jae-wook Shim, Kyunggi-Do (KR); Hwang-kyun Lee, Kyunggi-Do (KR); Hee-jung Ahn, Seoul (KR); Gil-soo Lee, Kyunggi-Do (KR)

(73) Assignee: Ktfreetel Co., Ltd. (KR)

( * ) Notice: Subject to any disclaimer, the term of this patent is extended or adjusted under 35 U.S.C. 154(b) by 712 days.

(21) Appl. No.: 11/298,756

(22) Filed: Dec. 9, 2005

(65) Prior Publication Data

US 2006/0109970 A1 May 25, 2006

Related U.S. Application Data

(63) Continuation of application No. PCT/KR2004/000580, filed on Mar. 17, 2004.

(30) Foreign Application Priority Data

Jul. 12, 2003 (KR) .................. 10-2003-0047553
Jul. 12, 2003 (KR) .................. 10-2003-0047554

(51) Int. Cl.
*H04B 1/38* (2006.01)
*H04Q 7/20* (2006.01)
(52) U.S. Cl. ................ 455/567; 455/414.1; 379/207.16
(58) Field of Classification Search ............. 455/414.1, 455/414.4, 567; 379/207.16
See application file for complete search history.

(56) References Cited

U.S. PATENT DOCUMENTS

2007/0294425 A1* 12/2007 Sobti et al. .................. 709/231
2008/0108334 A1* 5/2008 Wang et al. .............. 455/414.1

* cited by examiner

*Primary Examiner*—Lee Nguyen
(74) *Attorney, Agent, or Firm*—Knobbe Martens Olson & Bear LLP

(57) ABSTRACT

The disclosed technology relates to changing and pushing a sound source of a supplementary service using a ring back tone on calling. The first embodiment relates to a method and apparatus for changing a sound source of supplementary service using a ring back tone on calling. The second embodiment relates to a method and apparatus for pushing a sound source of a supplement service of a calling party to that of a called party on calling.

17 Claims, 25 Drawing Sheets

SOUND SOURCE
PUSH SERVICE
SHORTCUT KEY EXAMPLE

1+*:RINGBACK TONE REPLACING SOUND

2+*:RINGER

3+*:BACKGROUND MUSIC

4+*:MUSIC MAIL

5+*:MOD

6+*:VOD

METHOD AND APPARATUS FOR CHANGING A SOUND SOURCE OF A SUPPLEMENTARY SERVICE USING A RING BACK TONE ON CALLING

CROSS-REFERENCE TO RELATED APPLICATION

This application is a continuation under 35 U.S.C. §365(c) of International Application No. PCT/KR2004/000580 filed Mar. 17, 2004, designating the United States and claiming for the benefit of the earlier filing dates under 35 U.S.C. § 365(b) of Korean Patent Application Nos. 2003-0047553 and 2003-0047554 both filed Jul. 12, 2003, which are hereby incorporated herein by reference in their entirety. International Application No. PCT/KR2004/000580 was published in English as WO 2005/006721 A1 on Jan. 20, 2005, and is hereby incorporated herein by reference in its entirety.

BACKGROUND OF THE INVENTION

1. Field of the Invention

The present invention relates, in general, to a method of changing the ring back tone replacing sound of a called party to the sound source of another supplementary service of a calling party using a dual tone multi-frequency shortcut key during the placing of a call, a method of changing the ring back tone replacing sound or service sound source (title song) of the calling party to the sound source of the supplementary service of the called party, a method of pushing the service sound source of the calling party as the service sound source of the called party in real time during the placing of a call, and apparatuses for performing the methods.

2. Description of Related Technology

Generally, a ring back tone refers to a signal tone sent from a switching center to a calling terminal subscriber to inform the calling terminal subscriber that a calling signal is transmitting to a called terminal subscriber in a Public Switched Telephone Network (PSTN) or a mobile communication network. Recently, various ring back tone replacement services for replacing typical ring back tones represented by a conventional simple signal tone have been developed and used. For example, services, such as 2Ring, COLORing or FeelRing (the name of services provided in Korea) that allow a user to select a ring back tone replacing sound for replacing a ring back tone equally provided depending on the recommendations of the International Telecommunication Union-Telecommunication (ITU-T), have been tremendously popularized. Such a ring back tone replacement service is described in detail below.

First, if a calling terminal subscribes to a ring back tone replacement service and requests a call connection to a called terminal managed by a called party's Mobile Switching Center (MSC), a calling party's MSC requests call termination location information (location request) from a Home Location Register (HLR). The HLR requests routing information (routing request) from the called party's MSC in response to the request for the call termination location information, received from the calling party's MSC. The called party's MSC transmits routing information (Temporary Local Directory Number: TLDN) to the HLR in response to the routing information request signal received from the HLR. Thereafter, the HLR transmits call termination location information to the calling party's MSC using the received routing information.

The calling party's MSC requests an Integrated Services Digital Network (ISDN) User part (ISUP) call connection from the called party's MSC on the basis of the routing information. The called party's MSC reads ring back tone replacement service setting information, previously stored in a storage device, in response to the ISUP call connection request signal transmitted from the calling party's MSC. Thereafter, in the case where a user corresponding to the called terminal has subscribed to the ring back tone replacement service, the called party's MSC transmits the ISUP call connection request signal to a sound source control device, which is an Intelligent Peripheral (IP), through the use of the previously stored routing information of the sound source control device. At this time, the ISUP call connection request signal includes a called terminal identifier and calling terminal identifier. As a result of the above procedure, channels are established between the calling party's MSC, the called party's MSC and a sound source providing device.

The sound source providing device requests a sound source code from a sound source proving control server, which is a Service Control Point (SCP), on the basis of the called terminal identifier and calling terminal identifier. After the sound source providing control server searches for a sound source code, stored in connection with the called terminal identifier or the calling terminal identifier, in response to the sound source code request signal, and transmits the searched sound source code to the sound source providing device. Thereafter, the sound source providing device transmits a ring back tone replacing sound corresponding to the sound source code, received from the sound source providing control server, to the calling terminal through the established channel. When recognizing that the called terminal answers during the transmission of the ring back tone replacing sound to the calling terminal, the called party's MSC requests the sound source providing device to release the ISUP call. After receiving the ISUP call release request signal from the called party's MSC, the sound source providing device releases a channel established with the calling terminal. Thereafter, the called terminal performs normal communication using a channel established with the calling terminal.

As described above, a conventional ring back tone replacement service allows a called terminal subscriber to let a calling terminal subscriber listen to a ring back tone replacing sound that is selected by the called terminal subscriber and replaces a typical uniform ring back tone, through the use of the ring back tone replacement service. The reason that such a ring back tone replacement service commercially achieves success would be the fact that the service satisfies the desires of modern people for expressing their individualities to some degree.

However, in a conventional ring back tone replacement service, sound sources can be changed only when a user subscribes to a communication service provider having a corresponding sound source. In this way, various current supplementary services, such as a ring back tone replacement service, a background music service, a ringer service, a Karaoke service, a music mail service and a Music-On-Demand (MOD)/Video-On-Demand (VOD) service, are limited in that a user can use the services only when he or she has subscribed to a communication service provider having corresponding sound sources. Further, there is an inconvenience in that, in order to change the sound sources of conventional supplementary services, a user should access the home page, wireless Internet or Automatic Response System (ARS) of a communication service provider providing supplementary services, and enter the phone number of a called party.

Further, a conventional method of changing the sound sources of supplementary services is problematic in that, even when, for example, a calling party listens to the ring back tone replacing sound of a called party and is impressed thereby, the calling party cannot immediately set the sound source of his or her supplementary service, such as a ring back tone replacement service, to the sound source of the ring back tone replacing sound of the called party. Moreover, the conventional sound source change method for supplementary services is disadvantageous in that, since a supplementary service subscriber cannot change the sound sources of corresponding supplementary services in real time, the subscriber may forget that he or she will change a sound source later or forget the phone number of a called party, so that there may occur the case where he or she cannot change the sound sources of supplementary services.

Further, communication services providing various pieces of information to mobile information terminals, such as the mobile phones of subscribers, through various channels have recently increased with the development of electrical, electronic and communication fields. Under such environments, communication service providers provide supplementary services, such as a ring back tone replacement service, a background music service, a ringer service, a Karaoke service, a music mail service and a VOD/MOD service, to subscribers to comply with the demands of the subscribers desiring to use communication services more interestedly and individually. Recently, these supplementary services have been spotlighted by subscribers.

For example, a subscriber can wait for the establishment of a channel without tediousness while listening to an individual ring back tone replacing sound set by a calling party or called party, instead of a simple ring back tone, during the placing of a call. Further, the subscriber may freely register the popular songs of singers, popular sound effects and mentions, classical music, his or her own sound effects, etc., and use them as his or her ringers. Further, the subscriber may select a desired song or music as a background sound, and then talks to an opposite party while listening to the background sound during telephone conversation. In this way, conventional supplementary services allow the subscriber to more individually and interestedly use various communication services using the sound sources of the supplementary services selected by the subscriber.

However, in the conventional supplementary services, sound sources can be changed only when a user subscribes to a communication service provider having a corresponding sound source. That is, various current supplementary services, such as a ring back tone replacement service, a background music service, a ringer service, a Karaoke service, a music mail service and a Music-On-Demand (MOD)/Video-On-Demand (VOD) service, are limited in that a user can use the services only when he or she has subscribed to a communication service provider having corresponding sound sources. Further, there is an inconvenience in that, in order to change the sound sources of conventional supplementary services, a user should access the home page, wireless Internet or Automatic Response System (ARS) of a communication service provider providing supplementary services, and enter the phone number of a called party.

Further, a conventional method of changing the sound sources of supplementary services is problematic in that, even when, for example, a calling party listens to the ring back tone replacing sound of a called party and is impressed thereby, the calling party cannot immediately set the sound source of his or her supplementary service, such as a ring back tone replacement service, to the sound source of the ring back tone replacing sound of the called party. Moreover, the conventional sound source change method for supplementary services is disadvantageous in that, since a supplementary service subscriber cannot change the sound sources of corresponding supplementary services in real time, the subscriber may forget that he or she will change a sound source later or forget the phone number of a called party, so that the subscriber cannot easily change the sound sources of supplementary services at a desired time. Moreover, the conventional supplementary services are disadvantageous in that a calling party cannot immediately push his or her service sound source as the service sound source of a called party in real time while the calling party listens to the ring back tone replacing sound of the called party.

SUMMARY OF THE INVENTION

An object of the present invention is to provide a service method and apparatus, which allows a calling party to set or change the sound source of his or her supplementary service to a ring back tone replacing sound, set by a called party, in real time through the use of a DTMF shortcut key on a wired/wireless telephone during the placing of a call in a wired/wireless communication network regardless of whether the calling party subscribes to a ring back tone replacement service.

Another object of the present invention is to provide a service method and apparatus, which allows a calling party to present his or her ring back tone replacing sound or specific sound source (title song) to a called party as the sound source of the supplementary service thereof during the placing of a call.

Still another object of the present invention is to provide a service method and apparatus, which allows a non-subscribed called party to set the sound source of his or her supplementary service to a sound source gifted from a calling terminal subscriber, at the same time that the called party subscribes to a corresponding supplementary service, in real time during the placing of a call.

Still another object of the present invention is to provide a service method and apparatus, which allows a calling party to use the sound source of a ring back tone replacing sound from another communication service provider, which the calling party listens to, after placing a call using a mobile phone or a normal telephone in a wired/wireless communication network, as the sound source of the supplementary service provided from a communication service provider to which the calling party subscribes.

Still another object of the present invention is to provide a service method and apparatus, which allows a calling party to push the sound source of the supplementary service, set by the calling party through the wired/wireless Internet or ARS, or a basic sound source provided from a service provider, as the sound source of the supplementary service of a called party in real time through the use of a DTMF shortcut key during the placing of a call using a wired/wireless telephone in the wired/wireless communication network, regardless of whether the calling party subscribes to a ring back tone replacement service or a background music service.

Still another object of the present invention is to provide a service method and apparatus, which allows a called party to set the sound source of his or her supplementary service to a sound source gifted from a calling party and use the gifted sound source, at the same time that the called party automatically subscribes to a corresponding service in real time even though the called party is not a subscriber to the corresponding service.

Still another object of the present invention is to provide a service method and apparatus, which allows a calling party to immediately set the service sound source of a called party to the title song or ring back tone replacing sound, set by the calling party through the wired/wireless Internet or ARS, or a basic sound source provided from a service provider, using a DTMF shortcut key during the placing of a call.

In accordance with an aspect of the present invention, there is provided a method of providing a sound source change service, which changes a sound source of at least one supplementary service of a calling party using a sound source of a ring back tone replacing sound of a called party during placing of a call, in a service providing system connected to a Mobile Switching Center (MSC) managing at least one calling terminal and at least one called terminal through a mobile communication network, a service IP server and a Contents Provider (CP) server, comprising: detecting a DTMF shortcut key signal received from the calling terminal through the service IP server during the placing of a call using the calling terminal; receiving collected information from the service IP server in response to the DTMF shortcut key signal; processing the collected information in a predetermined form; transmitting a ring back tone replacing sound code included in the collected information to the CP server on the basis of the processed information, the CP server extracting a sound source code of the supplementary service corresponding to the ring back tone replacing sound code using a mapping table formed to allow a plurality of sound source codes, provided from at least a first Master Contents Provider (MCP) and a second MCP that provides the supplementary service to the calling party, and names of singers and titles of songs corresponding to the plurality of sound source codes to refer to each other; receiving the sound source code from the CP server; and transmitting a sound source change request signal including calling party information, included in the collected information, and the sound source code to the second MCP.

In accordance with another aspect of the present invention, there is provided a method of providing a sound source change service, which changes a sound source of at least one supplementary service of a calling party using a sound source of a ring back tone replacing sound of a called party during placing of a call, in a service providing system connected to a Mobile Switching Center (MSC) managing at least one calling terminal and at least one called terminal through a mobile communication network, a service IP server and a Contents Provider (CP) server, comprising: detecting a DTMF shortcut key signal received from the calling terminal through the service IP server during the placing of a call using the calling terminal; receiving collected information from the service IP server in response to the DTMF shortcut key signal; processing DTMF shortcut key information, included in the collected information; transmitting a ring back tone replacing sound code included in the collected information to a first Master Contents Provider (MCP) that provides the ring back tone replacing sound of the called party on the basis of the processed information; receiving sound source information corresponding to the ring back tone replacing sound code from the first MCP; transmitting the sound source information to the CP server, the CP server extracting a sound source code of the supplementary service corresponding to the sound source information using a mapping table; receiving the sound source code from the CP server; and transmitting a sound source change request signal including calling party information, included in the collected information, and the sound source code, to a second MCP that provides the supplementary service.

Preferably, the service IP server may be placed in the MSC. Further, the service IP server may be is placed in the service providing system.

Preferably, the collected information may include subscriber information, including a calling terminal identifier and a called terminal identifier corresponding to the called terminal, a sound source code including MCP identification (ID) and serial number corresponding to the first MCP, and the DTMF shortcut key information.

Preferably, the sound source change service providing method may further comprising the second MCP transmitting a sound source change request signal to a Service Control Point (SCP) when the supplementary service sound source is a ring back tone replacing sound source or a ring back tone sound source.

Preferably, the sound source change service providing method may further comprising notifying the calling terminal of change results for the supplementary service sound source using a short message through a Short Message Service Center (SMSC); and the calling terminal accessing an ARS server or a Web/Wireless Application Protocol (WAP)/Mobile Explorer (ME) server using a callback number to the ARS server or a callback URL to the Web/WAP (ME) server, included in the short message.

Preferably, the mapping table includes a database formed to allow a plurality of sound source codes for supplementary services, provided from the first and second MCPs, and names of singers and titles of songs corresponding to the plurality of sound source codes to refer to each other.

In accordance with another aspect of the present invention, there is provided a method of providing a sound source change service, which changes a sound source of at least one supplementary service of a calling party using a sound source of a ring back tone replacing sound of a called party during placing of a call, in a plurality of service providing systems each connected to at least one Mobile Switching Center (MSC) managing at least one calling terminal and at least one called terminal through a mobile communication network, at least one service IP server and at least one Contents Provider (CP) server, the service providing systems interworking with each other, comprising: detecting a DTMF shortcut key signal received from the calling terminal through a first service IP server in a first communication service provider network to which a called terminal subscriber subscribes during the placing of a call using the calling terminal; a first service providing system in the first communication service provider network receiving collected information from the first service IP server in response to the DTMF shortcut key signal; processing the collected information in a predetermined form; transmitting a ring back tone replacing sound code, included in the collected information, to a first MCP that provides the ring back tone replacing sound to the called party, on the basis of the processed information; receiving first sound source information corresponding to the ring back tone replacing sound code from the first MCP; the first service providing system transmitting the first sound source information to a second service providing system in a second communication service provider network to which a calling terminal subscriber subscribes; transmitting the first sound source information to a CP server in the second communication service provider network, the CP server extracting a sound source code of the supplementary service, corresponding to the first sound source information, using a mapping table formed to allow a plurality of pieces of sound source code information for the supplementary service of the calling party, and name information of a plurality of singers and title information of a plurality of songs corresponding to the sound source code information to refer to each other; receiving the sound source code from the CP server; and transmitting a sound source change request signal including calling party information, included in the collected information, and the sound source code to a second MCP that provides the supplementary service in the second communication service provider network.

Preferably, the sound source change service providing method may further comprise the second service providing system transmitting the calling party information and the first sound source information to a third MCP in the second communication service provider network interworking with the first MCP; receiving second sound source information, which corresponds to the first sound source information and is usable in the second communication service provider network, from the third MCP; and transmitting the second sound source information to the CP server so as to obtain the sound source code corresponding to the second sound source information.

In accordance with still another aspect of the present invention, there is provided a service providing apparatus for providing a sound source change service, which is coupled to a Mobile Switching Center (MSC) managing at least one calling terminal and at least one called terminal through a mobile communication network, a service IP server and a contents provider (CP) server and adapted to provide the sound source change service, which comprises a first service of changing a sound source of at least one supplementary service of a calling party using a sound source of a ring back tone replacing sound of a called party during placing of a call and a second service of changing a sound source of at least one supplementary service of the called party using a specific sound source of the calling party during the placing of a call, comprising: a DTMF signal detecting unit detecting a DTMF shortcut key signal received from the calling terminal through the service IP server during the placing of a call using the calling terminal; a collected information processing unit processing collected information, received from the service IP server, in a predetermined form; a data transmitting/receiving unit receiving the collected information from the service IP server in response to the DTMF shortcut key signal, transmitting a sound source information request signal adapted to request sound source information for the first supplementary service to a first MCP that provides the first supplementary service, receiving the sound source information from the first MCP, transmitting the sound source information to the CP server, receiving a sound source code from the CP server, and transmitting a sound source change request signal to a second MCP that provides the second supplementary service; and a control unit storing the processed information in a database, reading the processed information in a First-In First-Out (FIFO) manner, sequentially transmitting the read information to the first MCP, and controlling the DTMF signal detecting unit, the collected information processing unit and the data transmitting/receiving unit.

In accordance with still another aspect of the present invention, there is provided a method of providing a sound source push service, which pushes a sound source of at least one first supplementary service, set to correspond to at least one calling terminal, as a sound source of at least one second supplementary service, set to correspond to at least one called terminal, during placing of a call, in a service providing system coupled to a Mobile Switching Center (MSC) managing the calling terminal and the called terminal through a mobile communication network, a service IP server and a contents provider (CP) server, comprising: detecting a DTMF shortcut key signal received from the calling terminal through the service IP server during the placing of a call by the calling terminal; receiving collected information from the service IP server in response to the DTMF shortcut key signal; processing the collected information in a predetermined form; transmitting a sound source information request signal, adapted to request sound source information for the first supplementary service, to a first MCP that provides the first supplementary service on the basis of the processed information, the sound source information request signal including a calling terminal identifier corresponding to the calling terminal; receiving the sound source information from the first MCP; transmitting the sound source information to the CP server, the CP server extracting a sound source code corresponding to the sound source information using a mapping table; receiving the sound source code from the CP server; transmitting a sound source change request signal including called party information, included in the collected information, and the sound source code to a second MCP that provides the second supplementary service.

Preferably, the CP server, the first MCP and the second MCP may be included in a single contents provider.

Preferably, the sound source push service providing method may further comprise the second MCP transmitting a sound source change request signal to a Service Control Point (SCP) when the second supplementary service is a ring back tone replacement service or a ring back tone service.

Preferably, the sound source push service providing method may further comprise notifying the called terminal of sound source change results for the second supplementary service.

In accordance with still another aspect of the present invention, there is provided a method of providing a sound source push service, which pushes a sound source of at least one first supplementary service, set to correspond to at least one calling terminal, as a sound source of at least one second supplementary service, set to correspond to at least one called terminal, during placing of a call, in a plurality of service providing systems each connected to a Mobile Switching Center (MSC) managing the calling terminal and the called terminal through a mobile communication network, a service IP server and a contents provider (CP) server, comprising: detecting a DTMF shortcut key signal received from the calling terminal through a first service IP server in a first communication service provider network to which a calling terminal subscribes during the placing of a call using the calling terminal; a first service providing system in the first communication service provider network receiving collected information from the first service IP server in response to the DTMF shortcut key signal; processing the collected information in a predetermined form; transmitting a first sound source information request signal, adapted to request first sound source information for the first supplementary service, to a first MCP that provides the first supplementary service, on the basis of the processed information, the first sound source information request signal including a calling terminal identifier corresponding to the calling terminal; receiving the first sound source information from the first MCP; the first service providing system transmitting the first sound source information to a second service providing system in a second communication service provider network to which the called terminal subscribes; the second service providing system transmitting the first sound source information to a CP server in the second communication service provider network, the CP server extracting a sound source code corresponding to the first sound source information using a mapping table; receiving the sound source code from the CP server; and transmitting a sound source change request signal including called party information, included in the collected information, and the sound source code to a second MCP that provides the second supplementary service in the second communication service provider network.

In accordance with still another aspect of the present invention, there is provided a service providing apparatus, which is connected to a Mobile Switching Center (MSC) managing at least one calling terminal and at least one called terminal through a mobile communication network, a service IP server and a contents provider (CP) server, and adapted to provide a sound source push service of pushing a sound source of at least one first supplementary service, set to correspond to the calling terminal, as a sound source of at least one second supplementary service, set to correspond to the called terminal, during placing of a call, comprising: a DTMF signal detecting unit detecting a DTMF shortcut key signal received from the calling terminal through the service IP server during the placing of a call using the calling terminal; a collected information processing unit processing collected information received from the service IP server in a predetermined form; a data transmitting/receiving unit receiving the collected information from the service IP server in response to the DTMF shortcut key signal, transmitting a sound source information request signal adapted to request sound source information for the first supplementary service to a first MCP that provides the first supplementary service on the basis of information processed by the collected information processing unit, receiving the sound source information from the first MCP, transmitting the sound source information to the CP server, receiving a sound source code from the CP server, and transmitting a sound source change request signal to a second MCP that provides the second supplementary service; and a control unit storing the processed information in a database, reading the processed information in a First-In First-Out (FIFO) manner, sequentially transmitting the read information to the first MCP, and controlling the DTMF signal detecting unit, the collected information processing unit and the data transmitting/receiving unit.

BRIEF DESCRIPTION OF THE DRAWINGS

The features of the present invention will become more apparent and may be understood by referring to the following detailed description of preferred embodiments of the present invention, taken in conjunction with the accompanying drawings.

DESCRIPTION OF THE PREFERRED EMBODIMENT

Hereinafter, embodiments of the present invention will be described in detail with reference to the attached drawings.

First Embodiment

For reference, a service allowing a calling party to change the sound source of his or her supplementary service using the ring back tone replacing sound of a called party or to present the ring back tone replacing sound of the calling party to the called party as the sound source of the supplementary service thereof during the placing of a call is referred to as a sound source change service or a sound source change service during the placing of a call in the first embodiment to be described in the present specification.

Figure 1:
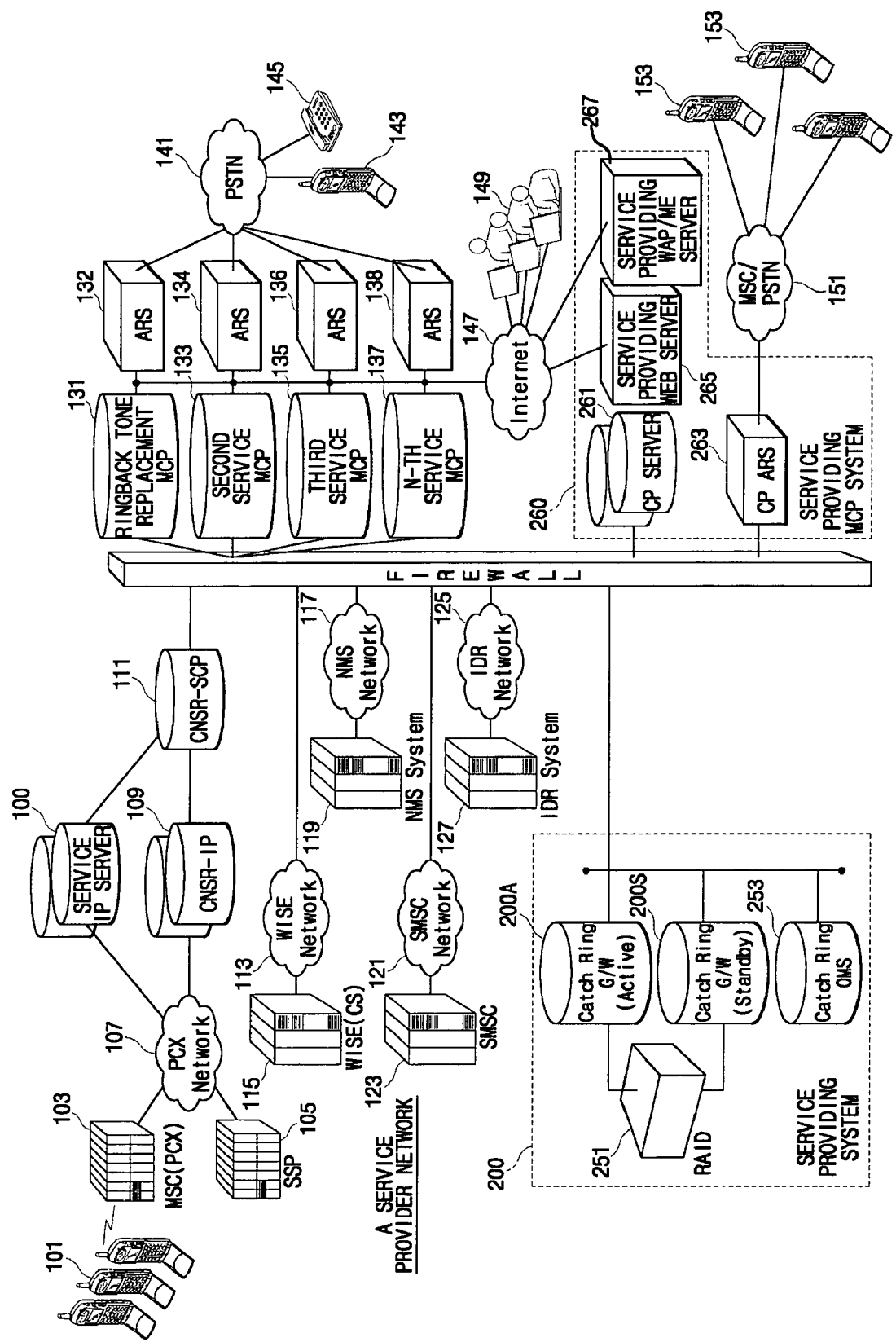
FIG. 1 is a view schematically showing the construction of a communication network to which a service according to a first embodiment of the present invention is applied.

FIG. 1 is a view schematically showing the construction of a communication network to which a service according to a first embodiment of the present invention is applied.

Referring to FIG. 1, the communication network according to a first embodiment of the present invention includes at least a Mobile Switching Center (MSC) 103 and a Home Location Register (HLR) as components constituting the communication network. Further, in order to provide, for example, a ring back tone replacement service and a background music service, the communication network includes a SCP 111 that manages subscriber information for both the ring back tone replacement service and the background music service, and the ring back tone replacing sound codes and background music codes thereof, and an Intelligent Peripheral (IP) 109 that plays the sound source of a supplementary service, such as a ring back tone. The IP 109 is some other service IP that plays the sound sources of other supplementary services (other services) on the channel of a subscriber besides the service of the present invention. Further, the communication network includes a plurality of Mater Contents Providers (MCPs) 131, 133, 135 and 137 that register sound sources and manage the files thereof with respect to respective supplementary services, such as a ring back tone replacement service, a background music service, a ringer service, a music mail service, a morning call service, and a MOD/VOD service. Further, the communication network performs basic functions while interworking with a service IP server 100 providing the service of the present invention as well as the above-described other service IP 109, the plurality of MCPs 131 to 137 providing conventional supplementary services, and a service providing MCP system 260, which is additional equipment to provide the service of the present invention.

In detail, the communication network of the present invention includes a Mobile Switching Center (MSC) 103 managing at least one mobile communication terminal 101, a Service Switching point (SSP) 105, the other service IP 109 connected to both the MSC 103 and the SSP 105 through a MSC network 107, the service IP server 100, and the SCP 111 connected to both the other service IP 109 and the service IP server 100. The SCP 111 is connected to a Wireless Information System Environment (WISE)/Client Care System (CS) 115, which is a kind of subscriber management server, through a WISE (CS/BS) network 113, which is a kind of subscriber management network, to a Network Management System (NMS) 119 through a NMS network 117, to a Short Message Service Center (SMSC) 123 through a SMSC network 121, and to an Internet Detail Record (IDR) system 127 through an IDR network 125.

Further, the communication network includes the plurality of MCPs 131, 133, 135 and 137. The MCPs 131 to 137 are coupled to Automatic Response Systems (ARSs) 132, 134, 136 and 138, respectively. The ARSs 132 to 138 are coupled to a mobile communication terminal 143 and a wired telephone 145 through a public switched telephone network or a mobile communication network 141. Further, the MCPs 131 to 137 and the ARSs 132 to 138 are coupled to at least one Internet user terminal 149 through the Internet 147.

Further, the communication network includes a service providing system 200 that provides a service (sound source change service during the placing of a call) of changing the sound source of another supplementary service using a ring back tone replacing sound during the placing of a call (hereinafter referred to as a "service providing system"). The service providing system 200 is coupled to the service IP server 100, the SCP 111 and the MCPs 131 to 137 through a firewall. The service providing system 200 includes a gateway (G/W) as a basic service providing apparatus. For example, the service providing system 200 includes a first service providing G/W 200A and a second service providing G/W 200S, as shown in FIG. 1. In this case, the first and second service providing G/Ws 200A and 200S are operated as active-active servers or active-standby servers.

Further, the service providing system 200 may include a Redundant Array of Inexpensive Disks (RAID) 251 coupled to the first and second service providing G/Ws 200A and 200S, as shown in FIG. 1. The RAID 251 represents a device of repeatedly storing the same important data in various devices. If the RAID 251 is used, data input/output operations are balanced and overlapped, thus improving an entire system performance.

Further, the service providing system 200 may include an Operation, Administration and Maintenance Server (OA&M server: OMS) 253 coupled to both the first and second service providing G/Ws 200A and 200S. The OMS 253 has a function of operating and administering the system and executing billing processing and statistical processing at a remote place. The OMS 253 provides graphic user environments for convenience of operators. The OMS 253 is comprised of a server that operates/administers the service providing system 200, and subscribers. The OMS 253 functions as OA&M that performs configuration management, statistics management, operation management and fault management for the service providing system 200 and the RAID 251. For this function, the OMS 253 includes an interworking function with a Contents Provider (CP) server 261 and a CP ARS 263, which will be described later, a Web-based OA&M function, a Man Machine Communication (MMC) and Common Line Interface (CLI) processing function, a system configuration management function, a mapping table code management and statistics inquiry function, a system status and fault management function, and an interworking function with the NMS.

Further, the communication network of the present invention includes the CP server 261 and the CP ARS 263 coupled to the SCP 111, the MCPs 131 to 137, and the service providing system 200. The CP server 261 and the CP ARS 263 are adapted to provide the service of the present invention, and used as a service providing MCP system 260 for the present service. The CP ARS 263 may be included in the CP server 261. In this case, the CP server 261 represents the service providing MCP system 260. Further, both a service providing Web server 265 and a service providing Wireless Application Protocol (WAP)/Mobile Explorer (ME) server 267 coupled to the Internet 147 may be coupled to the CP server 261. The CP ARS 263 is coupled to at least one telephone terminal 153 through the mobile communication network/public switched telephone network 151.

In the means time, when a subscriber requests the setting or change of a sound source to a supplementary service sound source through the use of a DTMF signal during the placing of a call, the CP server 261 of the present invention functions to change the sound source code of another supplementary service to correspond to the service provided from the service providing system 200 using subscriber information and corresponding sound source information while interworking with the service providing system 200. Further, the CP server 261 includes a connection protocol processing unit with the service providing system 200, a sound source managing unit for a communication supplementary service of the present invention (hereinafter referred to as a "sound source change service"), a subscriber managing unit for the sound source change service, a code managing unit for sound sources in the service providing system, a code managing unit for sound sources provided from other service providers, an update functioning unit of the service providing system for sound source codes, a database managing unit managing a sound source code DB, a sound source change service subscriber information DB, an external CP/MCP information DB and an external CP/MCP sound source code DB, a backup functioning unit, a statistics managing unit managing protocol message processing statistics, sound source code change statistics according to service providers and system load factor statistics, and a fault management functioning unit managing the connection failures of the service providing system and system failures.

The CP ARS 263 of the present invention allows a calling terminal subscriber or a called terminal subscriber to set/change and listen to the sound source of his or her supplementary service using a mobile communication terminal, or to use other services, such as gifts of the sound sources for friends. For this operation, the CP ARS 263 includes an interworking function with the service providing system 200, an interworking function based on ITU-T No. 7 signaling or R2/PRI signaling with the mobile switching center (MSC) and the PSTN switching center, a first connection protocol processing function that processes a connection protocol with the CP server 261, a second connection protocol processing function that processes a connection protocol with the MCP 131 providing conventional supplementary services, such as ring back tone replacement services including conventional FeelRing, COLORing and 2Ring, and a third connection protocol processing function that processes a connection protocol with other external MCPs.

Further, the CP ARS 263 includes a sound source download and management function for the sound source change service of the present invention, a supplementary service function of gifting a selected sound source to a subscriber to another service provider, copying the supplementary service sound source of the subscriber to another service provider and interworking between different network service providers, a statistic function including the statistics of selected sound sources, call processing statistics and system load factor statistics, and a fault management function for system failure management and TCP/IP interworking fault processing. Further, the CP ARS 263 may process ITU-T No. 7 signaling user part SS7 ISUP and Interactive Voice Response (IVR) signals in the CP ARS server.

In the meantime, the above-described service IP server 100 is predicted to be placed in the MSC 103 or the service providing system 200 with the later technical development of electronic communication equipment. Therefore, the present invention includes an example in which the service IP server 100 is an independent device, or in which it is an IP functioning unit placed in the MSC 103 or the service providing system 200.

Figure 2:
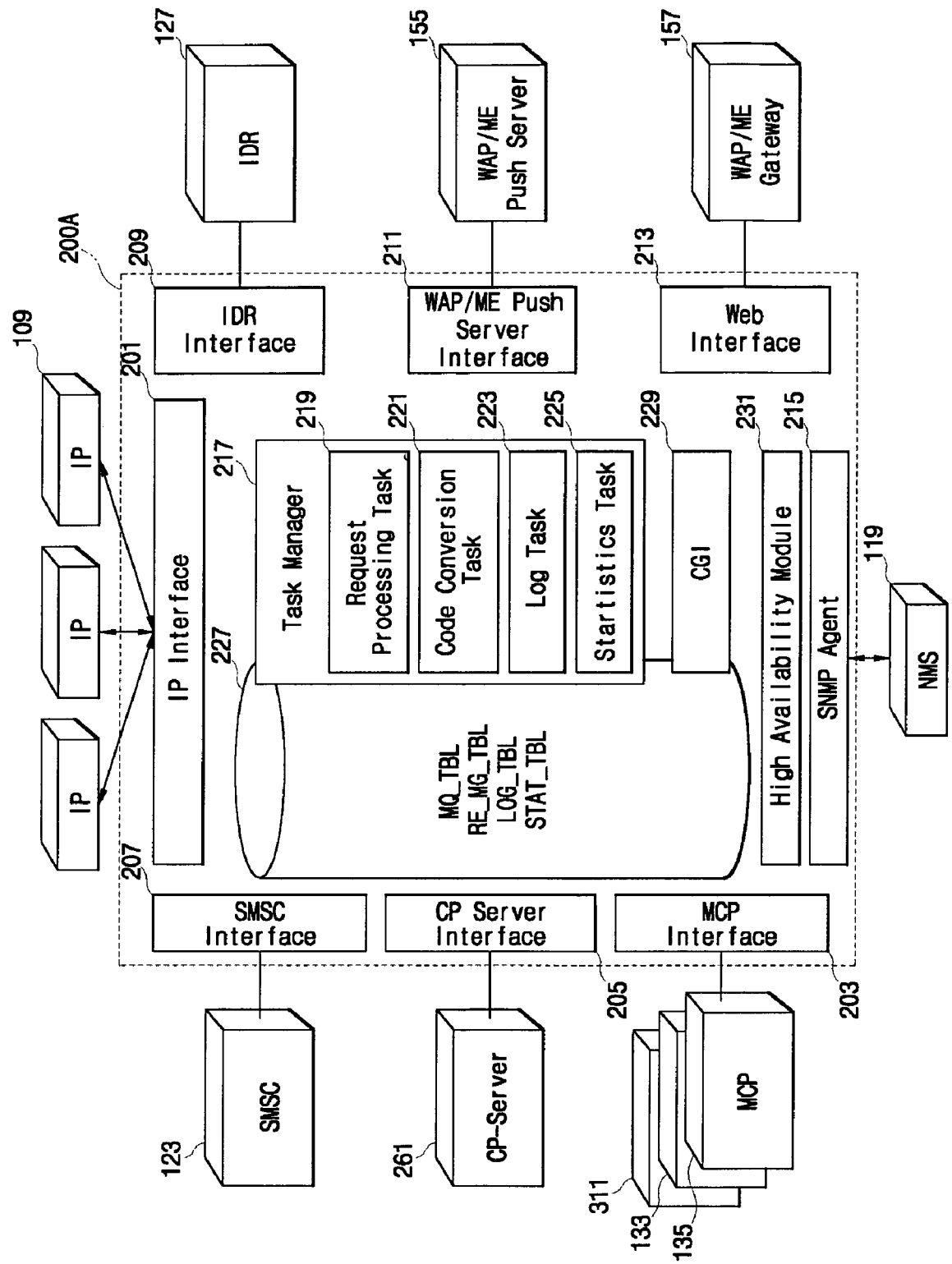
FIG. 2 is a block diagram showing a service providing apparatus according to a first embodiment of the present invention.

FIG. 2 is a block diagram showing a service providing apparatus according to a first embodiment of the present invention.

Referring to FIG. 2, the service providing apparatus according to the first embodiment of the present invention is a service device for allowing a calling terminal subscriber to change the sound source of the ring back tone replacing sound of a called party to the sound source of the supplementary service of the calling party using a DTMF shortcut key during the placing of a call, or to gift the sound source of the ring back tone replacing sound or title song of the calling party or specific sound source corresponding thereto to the called party as the sound source of the supplementary service of the called party. The service providing apparatus 200A basically includes an external data receiving unit receiving a user signal from an external intelligent network, a data processing unit processing received data, a database processing unit, and an external data transmitting unit transmitting processed data to another server.

In detail, for parts for the transmission/reception of external data, the service providing apparatus 200A includes an IP interface 201 coupled to at least one service IP server 100, an MCP interface 203 coupled to the MCPs 131, 133 and 135, a CP server interface 205 coupled to the CP server 261, an SMSC interface 207 coupled to the SMSC 123, an IDR interface 209 coupled to the IDR 127, a WAP/ME push server interface 211 coupled to the WAP/ME push server 155, a Web interface 213 coupled to a WAP/ME gateway 157, and a Simple Network Management Protocol (SNMP) agent 215 coupled to the NMS 119. The above-described SMSC interface 207 is an interface for Short Message Service (SMS) notification according to new subscription. For this operation, the SMSC interface 207 may use Short Message Peer-to-Peer (SMPP) protocol. The IDR interface 209 is an interface interworking with the IDR 127 for the billing for services. The IDR interface 209 complies with standards defined by respective communication network service providers.

Further, the service providing apparatus 200A includes a task manager 217 managing all tasks in the system, a database 227 connected to the task manager 217, a Common Gateway Interface (CGI) 229 connected to the task manager 217, and a high availability module 231 increasing the availability of the system. The task manager 217 includes a request processing task 219 adapted to request the setting or change of sound sources from the SCP 111 through the CP server 261 or the MCPs 131, 133 and 135, a code conversion tasks 221 converting the different sound source codes of the respective MCPs into the sound source codes of required supplementary services, a log task 223 recording a log for tasks performed by the task manager 217, and a statistics task 225 processing the statistics of the tasks performed by the task manager 217.

Through the above-construction, the present invention can provide the following advantages to service users. First, a service subscriber can immediately set the sound source of his or her at least one supplementary service to the ring back tone replacing sound of an opposite party after listening to the ring back tone replacing sound, using a DTMF shortcut key at the time of attempting each telephone call on-line. Second, a non-subscriber can immediately subscribe to a corresponding service and set a sound source in real time after listening to the ring back tone replacing sound of the opposite party at the time of attempting a telephone call on line. Third, a calling subscriber can conveniently set and manage a sound source (title song) to be gifted to an opposite party (a called party) through the wired/wireless Internet and the CP ARS. Fourth, the calling subscriber can induce an opposite party to subscribe to the corresponding service and to set a service sound source to the sound source of the corresponding service by gifting a sound source (title song or ring back tone replacing sound), set by the calling subscriber, to the opposite party as the sound source of the supplementary service thereof using a DTMF shortcut key at the time of attempting each telephone call on line.

Further, the present invention can provide the following advantages to communication service providers. First, a mobile communication service provider can yield additional profits due to the inducement of new subscription to supplementary services and the increased number of subscribers. Second, in the case of the mobile communication service provider, the MCP and the CP, a subscriber can frequently change previously produced sound sources and then increase additional profits due to the change/reuse of the sound sources. Third, the inducement of the new subscription of users, who do not know a method and procedure of subscribing to the service and are incapable of subscribing to the service, can be increased.

Figure 3:
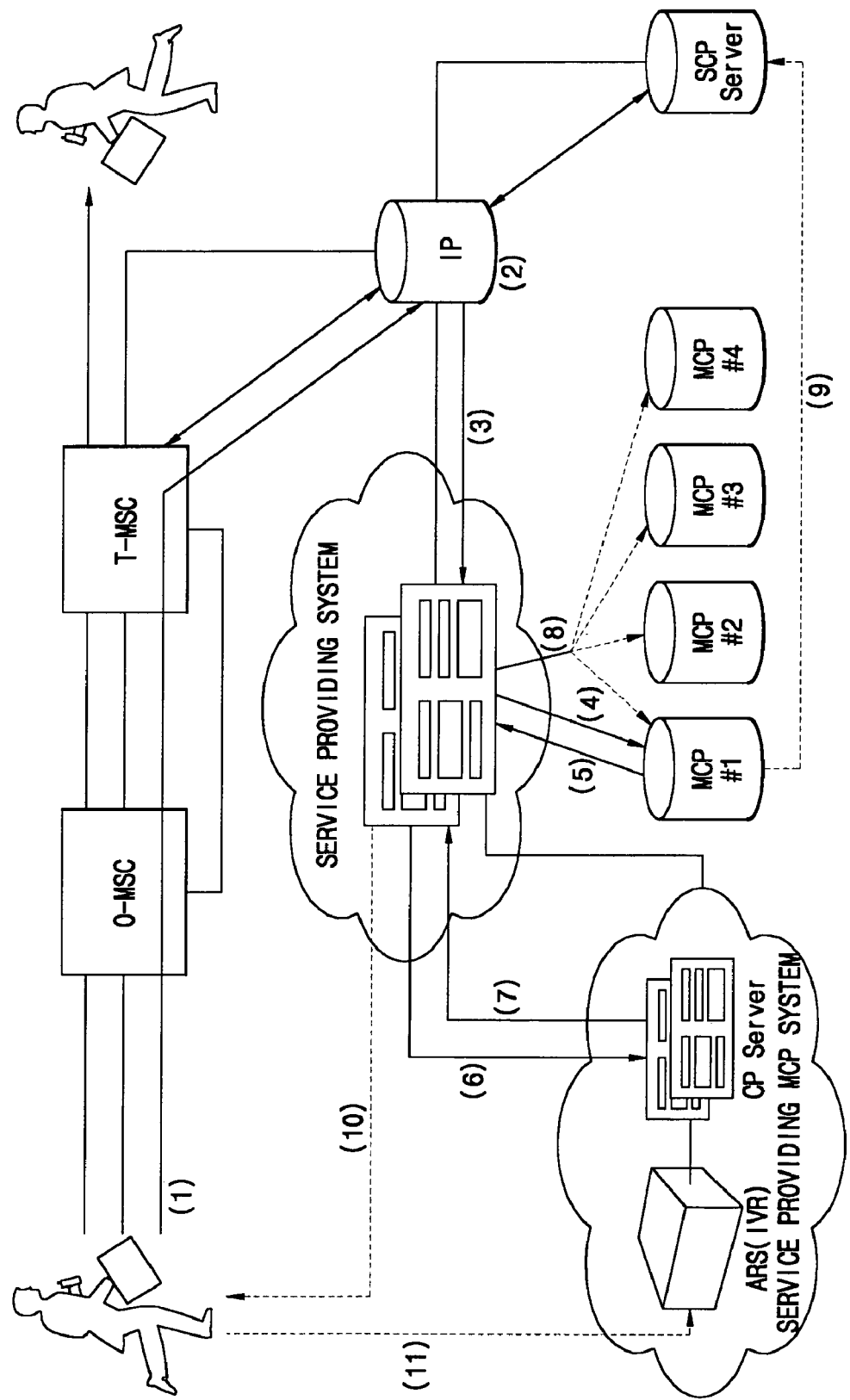
FIG. 3 is a diagram showing a service of changing the sound source of another supplementary service using a ring back tone replacing sound during the placing of a call according to a first embodiment of the present invention.
Figure 4:
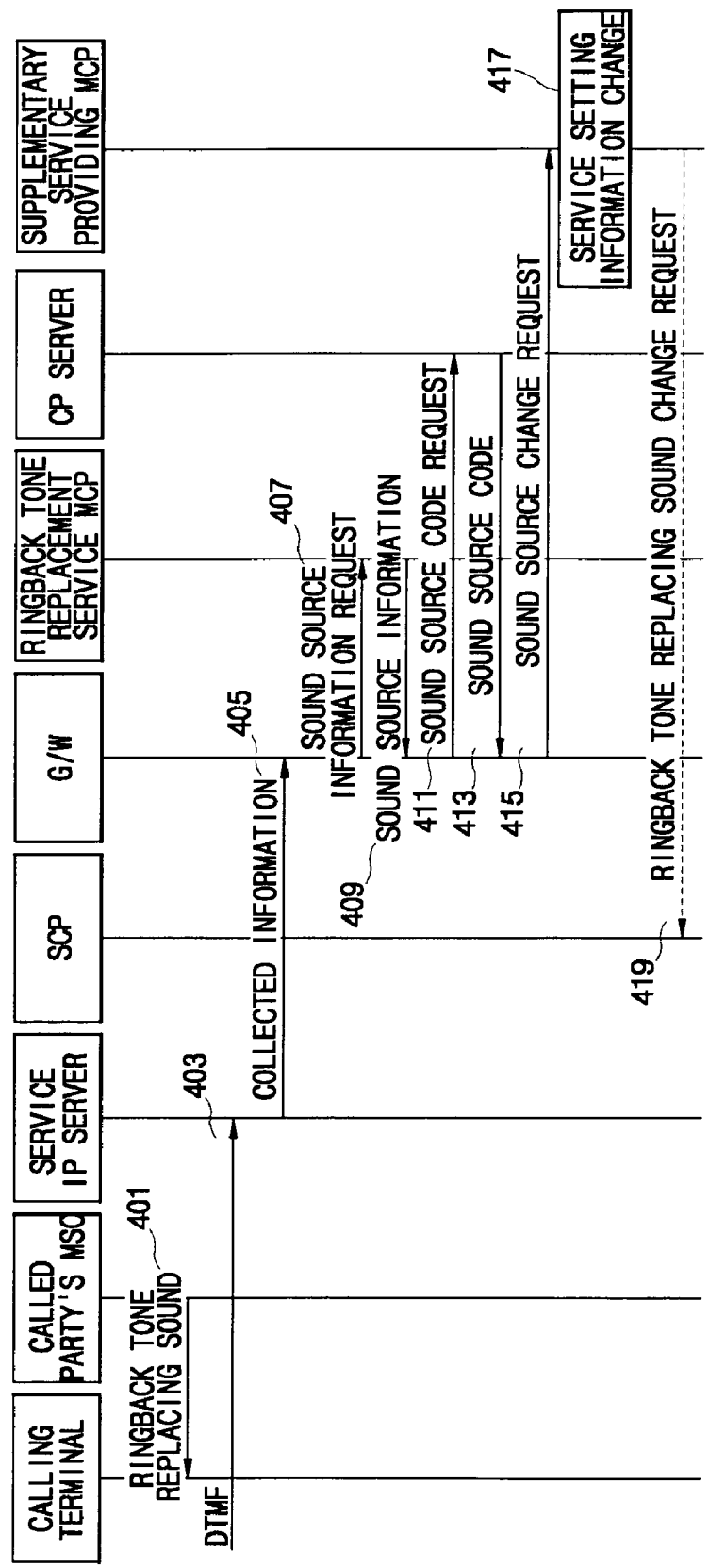
FIG. 4 is a signal flowchart showing the signal processing method of the service according to a first embodiment of the present invention.

FIG. 3 is a view showing a service of allowing a calling party to set the sound source of his or her supplementary service to the sound source of the ring back tone replacing sound of a called party using a DTMF shortcut key during the placing of a call according to a first embodiment of the present invention. FIG. 4 is a signal flowchart showing the signal processing method of the service according to a first embodiment of the present invention.

Referring to FIGS. 3 and 4, if the calling party places a call to a called party who has subscribed to a ring back tone replacement service, the calling party receives the ring back tone replacing sound of the called party depending on a ring back tone replacement service scenario at step 401. At this time, if the calling party is impressed thereby the ring back tone replacing sound of the called party and desires to change the ring back tone replacing sound to his or her own service sound source, the calling party presses a DTMF shortcut key for the service sound source on a calling terminal at step 403. The service IP server detects the corresponding shortcut key, and transmits information on a calling party phone number (calling party Mobile Identification Number: MIN), a called party phone number (called party MIN), a ring back tone replacing sound code and a DTMF shortcut key, which the service IP server collects for a current service, to the service providing system at step 405. The shortcut key for the service sound source is preset in such a way that, for example, 1# is used to change a ring back tone replacing sound, 2# is used to change background music, 3# is used to change a ringer, 4# is used to change a music mail, 5# is used to change MOD, and 6# is used to change VOD. Further, the service providing system includes a gateway (G/W) as the service providing apparatus of the present invention.

Next, the service providing system analyzes data received from the service IP server. That is, after analyzing at least the DTMF shortcut key, the service providing system transmits subscriber information and sound source information to the ring back tone replacement service MCP so as to detect the sound source information of the called party, for example, the name of a singer and the title of a song at step 407. The ring back tone replacement service MCP extracts the name of the singer name and the title of the song corresponding to the ring back tone replacing sound code and transmits the extracted information to the service providing system at step 409.

The service providing system requests a sound source code, which will be used for a supplementary service whose sound source is to be adopted in response to the request of the calling party and which corresponds to the name of the singer and the title of the song, from the CP server interworking with the service providing system to perform the service of the present invention at step 411. In response to the request, the CP server extracts the sound source code and transmits the extracted sound source code to the service providing system at step 413. The service providing system requests a corresponding supplementary service providing MCP that provides the supplementary service of the calling party to set and change a sound source using the received sound source code at step 415.

The supplementary service providing MCP, having received the sound source change request signal from the service providing system, changes service setting information set with respect to the calling party at step 417. At this time, if the service to be changed is a ring back tone replacement service, the supplementary service providing MCP requests the SCP to change the sound source of the ring back tone replacing sound of the calling party at step 419. Thereafter, the service providing system may notify the calling party of the sound source change results using SMS, as shown in FIG. 3 (10). If the calling party does not subscribe to the corresponding service yet, the service providing system may request the WISE (CS) to register the calling party as a new subscriber, allow the calling party to automatically subscribe to the corresponding service, and notify the calling party of sound source change results together with the subscription contents thereof. After a telephone conversation, the calling party accesses the ARS using a callback number or URL address included in an SMS message to subscribe to the service, listen to the sound source, and confirm the change of the sound source (11).

Figure 5:
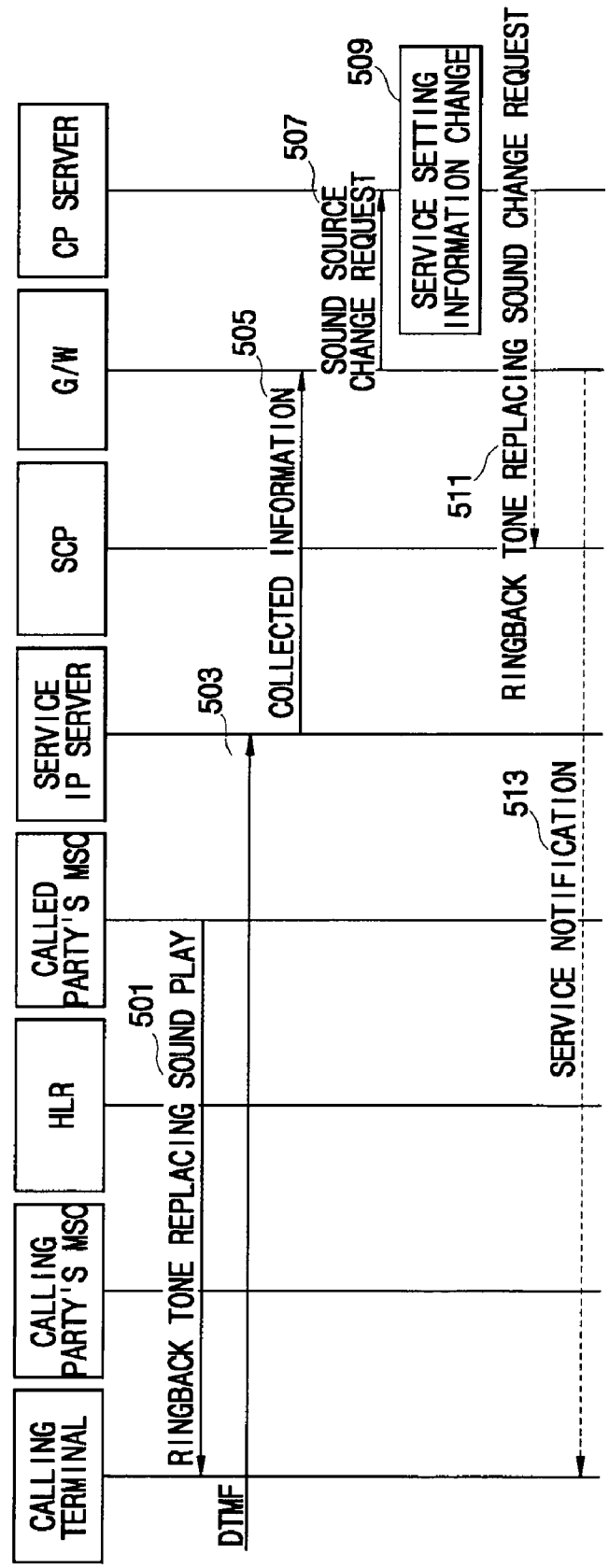
FIG. 5 is a signal flowchart showing the signal processing method of the service according to a first embodiment of the present invention.

FIG. 5 is a signal flowchart showing the signal processing method of the service according to a first embodiment of the present invention.

Referring to FIG. 5, if the CP server is constructed to include a plurality of MCP functions of providing respective supplementary services, the present invention can provide the service through a simplified procedure compared to the above-described embodiment. In detail, if the calling party places a call to a called party, who has subscribed to a ring back tone replacement service, the calling party receives the ring back tone replacing sound of the called party depending on a ring back tone replacement service scenario at step 501. At this time, if the calling party is impressed thereby the ring back tone replacing sound of the called party and desires to change the ring back tone replacing sound to his or her supplementary service sound source, the calling party presses a DTMF shortcut key for the service sound source on a calling terminal at step 503. The service IP server detects the corresponding shortcut key, and transmits information on a calling party phone number (calling party MIN), a called party phone number (called party MIN), a ring back tone replacing sound code and a DTMF shortcut key, which the service IP server collects for a current service, to the service providing system at step 505.

The service providing system detects a service request from the calling party by analyzing data received from the service IP server. Thereafter, the service providing system transmits subscriber information and sound source information to the CP server that provides the service of the present invention while interworking with the service providing system at step 507. At this time, the CP server recognizes the received information as a sound source change request signal for the specific supplementary service of the calling party, and changes the service setting information for the specific supplementary service of the calling party at step 509. If the service requested to be changed by the calling party is the ring back tone replacement service, the CP server requests the SCP to change the sound source of the ring back tone replacing sound of the calling party at step 511. Thereafter, the service providing system notifies the calling party of the sound source change results using SMS at step 513. If the calling party does not subscribe to the ring back tone replacement service yet, the service providing system may request the WISE (CS) to register the calling party as a new subscriber, allow the calling party to automatically subscribe to the corresponding service, and notify the calling party of sound source change results together with the subscription contents thereof using SMS, as described in the above-embodiment. After a telephone conversation, the calling party accesses the ARS using a callback number or URL address included in an SMS message to subscribe to the service, listen to the sound source, and confirm the change of the sound source.

As described above, the service providing system according to the first embodiment of the present invention receives sound source information, such as the name of a singer and the title of a song, from the above-described ring back tone replacement service MCP, requests and obtains a sound source code corresponding to the sound source information from the CP server providing the present service. Thereafter, the service providing system extracts the corresponding sound source code from the CP server and changes the service setting information without requesting the above-described supplementary service providing MCP to change a sound source, thus providing the service of the present invention. At this time, the CP server includes the sound source information of respective ring back tone replacement service MCPs, and the service providing function of the supplementary service providing MCP. Especially, the CP server includes a mapping table formed to allow the sound source codes of various supplementary services, provided from the supplementary service providing MCPs, to refer to each other through the use of the sound source codes corresponding to ring back tone replacing sounds provided from the ring back tone replacement service MCP. The information in the mapping table is periodically updated by the respective MCPs.

Figure 6:
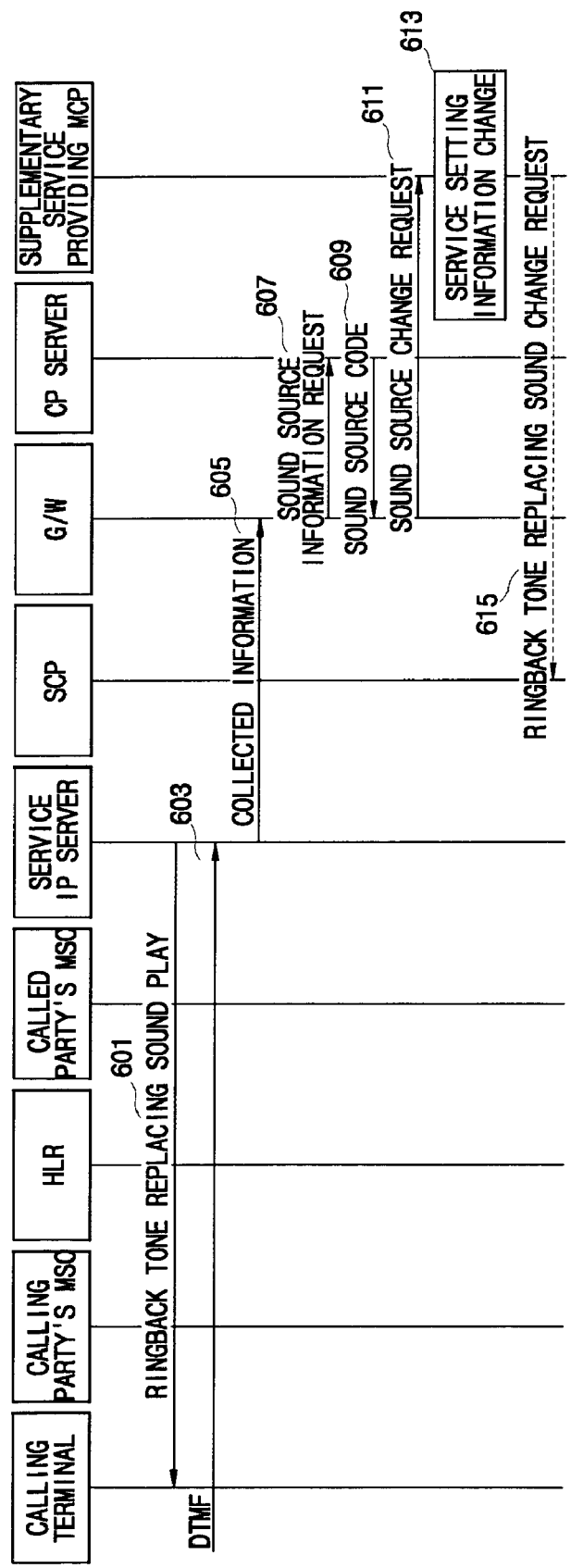
FIG. 6 is a signal flowchart showing the signal processing method of the service according to a first embodiment of the present invention.

FIG. 6 is a signal flowchart showing the signal processing method of the service according to a first embodiment of the present invention.

Referring to FIG. 6, if the CP server is constructed to include a plurality of MCP functions of providing respective supplementary services, the present invention can provide the service through a simplified procedure compared to the above-described embodiment. In detail, if a calling party places a call to a called party, who has subscribed to the ring back tone replacement service, the calling party receives the ring back tone replacing sound of the called party depending on a ring back tone replacement service scenario at step 601. At this time, if the calling party is impressed thereby the ring back tone replacing sound of the called party and desires to change the ring back tone replacing sound to his or her own service sound source, the calling party presses a DTMF shortcut key for the service sound source on a calling terminal at step 603. The service IP server detects the corresponding shortcut key, and transmits information on a calling party phone number (calling party MIN), a called party phone number (called party MIN), a ring back tone replacing sound code and a DTMF shortcut key, which the service IP server collects for a current service, to the service providing system at step 605.

The service providing system requests a sound source code, which will be used for a supplementary service whose sound source is to be changed, from the CP server that provides the service of the present invention while interworking with the service providing system at step 607. At this time, the CP server extracts a sound source code from a mapping table by applying the subscriber information and the ring back tone replacing sound code, received from the service providing system, to the mapping table, and then transmits the sound source code to the service providing system at step 609. Further, the service providing system requests the supplementary service providing MCP that provides the supplementary service requested to be changed by the calling party to change the sound source using the received sound source code at step 611.

The supplementary service providing MCP, having received the sound source change request signal from the service providing system, changes service setting information set with respect to the calling party at step 613. At this time, if the sound source to be changed is a ring back tone replacing sound source, the supplementary service providing MCP requests the SCP to change the sound source of the ring back tone replacing sound of the calling party at step 615. Thereafter, the service providing system may notify the calling party of the sound source change results using SMS. If the calling party does not subscribe to the corresponding service yet, the service providing system may request the WISE (CS) to register the calling party as a new subscriber, allow the calling party to automatically subscribe to the corresponding service, and notify the calling party of sound source change results together with the subscription contents thereof using SMS, as described in the above-described embodiments. After a telephone conversation, the calling party accesses the ARS using a callback number or URL address included in an SMS message to subscribe to the service, listen to the sound source, and confirm the change of the sound source.

As described above, the service providing system according to the first embodiment of the present invention may be adapted to request and obtain subscriber information and a sound source code corresponding to the ring back tone replacing sound code of the called party from the CP server and then request the supplementary service providing MCP to change the sound source, without receiving sound source information, such as the name of a singer and the title of a song, from the above-described ring back tone replacement service MCP. At this time, the CP server includes the sound source information of respective ring back tone replacement service MCPs. Especially, the CP server includes a mapping table adapted to map the sound source codes of various supplementary services, provided from the supplementary service providing MCPs, through the use of subscriber information and the ring back tone replacing sound codes provided from the ring back tone replacement service MCPs. The information in the mapping table is periodically updated by at least MCPs provided in called and calling party sides.

Figure 7:
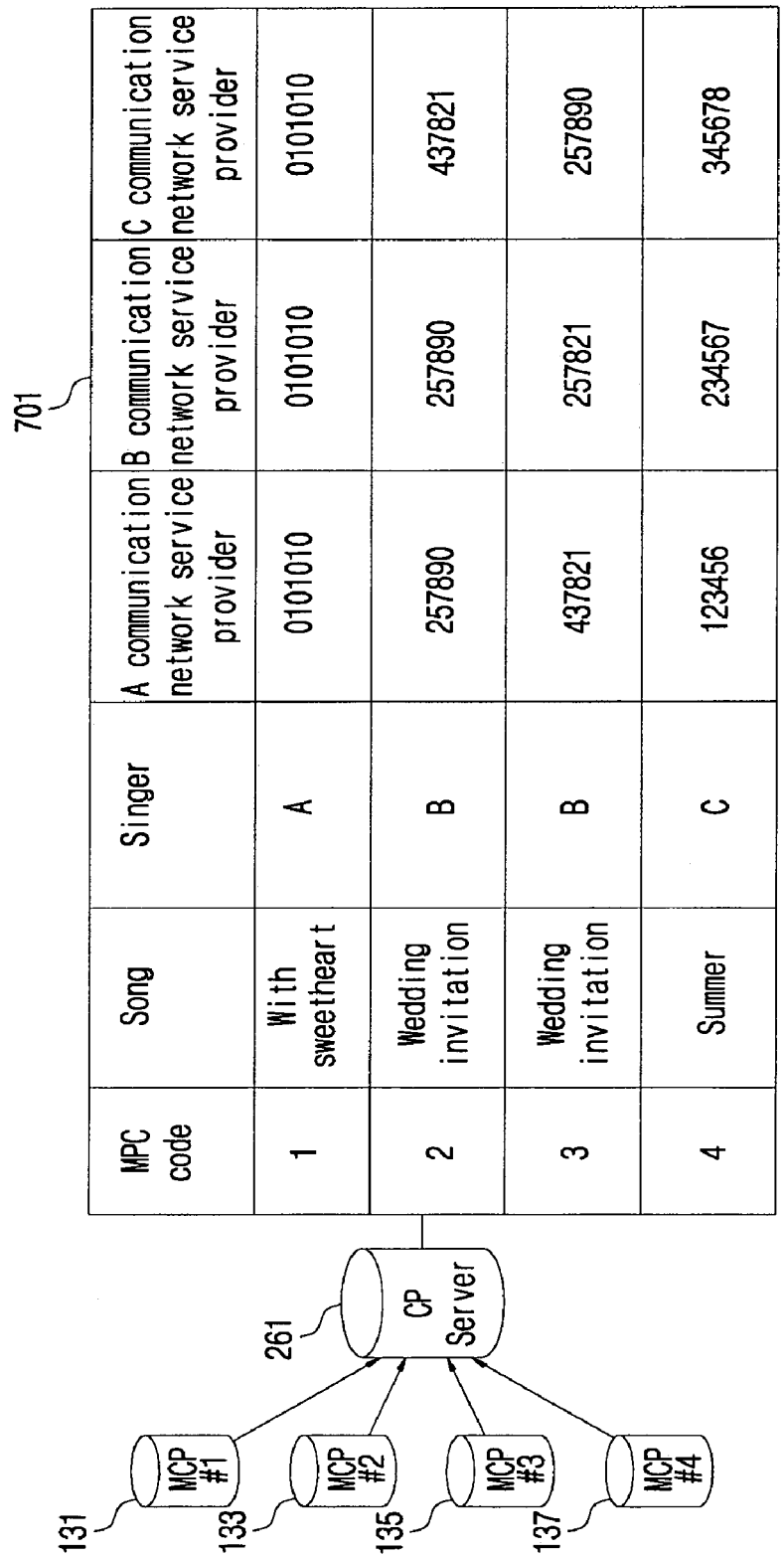
FIG. 7 is a view showing a CP server according to a first embodiment of the present invention.

FIG. 7 is a view showing the CP server according to a first embodiment of the present invention.

Referring to FIG. 7, the CP server 261 of the present invention frequently registers/uploads sound source information and sound source codes used for the provision of services through the plurality of MCP servers 131, 133, 135 and 137 that provide contents to the respective communication network service providers. At this time, the CP server 261 configures a table using information on the service sound sources used in the respective communication networks, and configures and stores a mapping table 701 in which different service sound sources in the plurality of MCPs or the plurality of communication networks can be mutually converted into actually identical sound sources.

TABLE 1

| MCP code | Song | Singer | A communication network service provider | B communication network service provider | C communication network service provider |
| --- | --- | --- | --- | --- | --- |
| 1 | With sweetheart | A | 0101010 | 0101010 | 0101010 |
| 2 | Wedding invitation | B | 257890 | 257890 | 437821 |
| 3 | Wedding invitation | B | 437821 | 257821 | 257890 |
| 4 | Summer | C | 123456 | 234567 | 345678 |

As described above, the CP server of the present invention includes, for example, a mapping table for the conversion of sound source codes shown in Table 1, thus enabling, for example, a calling party to use the ring back tone replacing sound of a called party as the supplementary service sound source of the calling party while interworking with the service providing system, the ring back tone replacement service MCP and the supplementary service providing MCPs.

Figure 8:
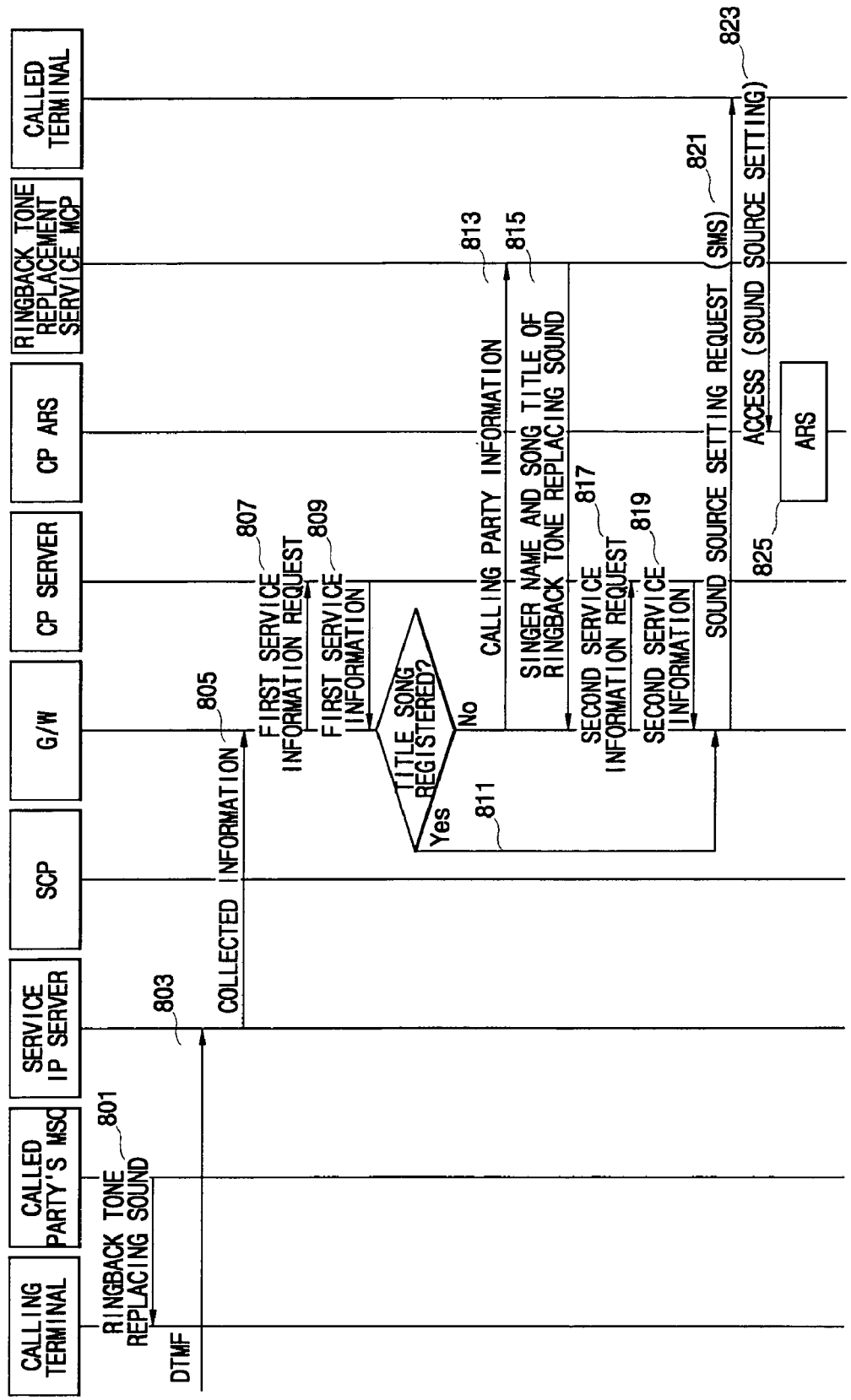
FIG. 8 is a signal flowchart showing the signal processing method of the service of changing the sound source of another supplementary service using a ring back tone replacing sound during the placing of a call according to a first embodiment of the present invention.
Figure 9:
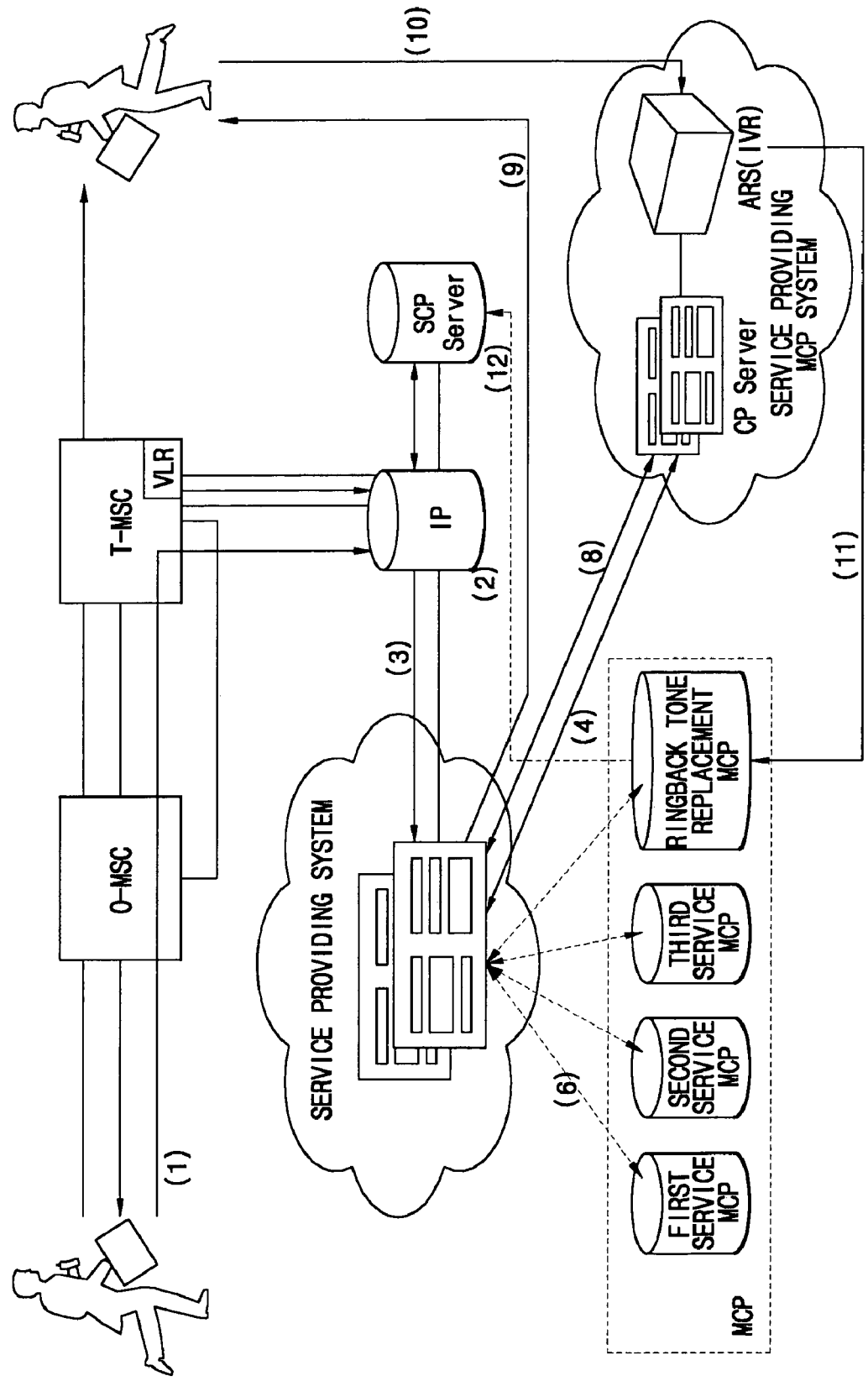
FIG. 9 is a diagram showing the signal processing method of the service according to a first embodiment of the present invention.

FIG. 8 is a signal flowchart showing the signal processing method of the service of allowing a calling party to set the supplementary service sound source of a called party to the ring back tone replacing sound source of the calling party or a title song, designated by the calling party through a Web/WAP (ME) or ARS, through the use of a DTMF shortcut key during the placing of a call using a mobile phone according to a first embodiment of the present invention. FIG. 9 is a diagram showing the processing method of the service according to a first embodiment of the present invention. In this embodiment, there is described a method of allowing a calling party to gift his or her preset sound source or ring back tone replacing sound to a called party as the sound source of the supplementary service of the called party during the placing of a call.

Referring to FIGS. 8 and 9, if the calling party places a call to a called party, who has subscribed to a ring back tone replacement service, the calling party receives the ring back tone replacing sound depending on the ring back tone replacement service scenario of the called party at step 801. At this time, the calling party presses a DTMF shortcut key for the service sound source on a calling terminal when desiring to gift his or her preset specific sound source (hereinafter referred to as a "title song") or ring back tone replacing sound to a called party as the sound source of the supplementary service of the called party at step 803. For example, DTMF shortcut keys for service sound sources may include a shortcut key "*+1" for a gift of a ring back tone replacing sound, a shortcut key "*+2" for a gift of background music, a shortcut key "*+3" for the gift of a ringer sound source, a shortcut key "*+4" for the gift of a music mail sound source, a shortcut key "*+5" for the gift of a MOD sound source, and a shortcut key "*+6" for the gift of a VOD sound source.

If the shortcut key for the service sound source is input from the calling terminal, the service IP server detects the corresponding shortcut key, and transmits information on a calling party phone number (calling party MIN), a called party phone number (called party MIN), a ring back tone replacing sound code and a DTMF shortcut key, which the service IP server collects for the current ring back tone replacement service, to the service providing system at step 805. The service providing system includes a gateway (G/W) as the service providing apparatus of the present invention.

The service providing system requests the registration of a gift while requesting first service information including the title song information of the calling party from the CP server that interworks with the service providing system to provide the present service at step 807. Further, the service providing system receives the first service information from the CP server at step 809. If the title song of the calling party is registered, the service providing system notifies the called party of the request for the setting of the sound source using SMS at step 811.

If the title song of the calling party is not registered, the service providing system transmits calling party information to the ring back tone replacement service MCP of the calling party, and receives the name of a singer and the title of a song corresponding to the ring back tone replacing sound from the ring back tone replacement service MCP at steps 813 and 815. Further, the service providing system requests the registration of a gift while requesting second service information including a sound source code corresponding to the name of a singer and the title of a song to be used for the gift service from the CP server at step 817. Further, the service providing system receives the second service information from the CP server at step 819. Thereafter, the service providing system notifies the called party of a setting request for a gift of the sound source using SMS at step 821. The called party accesses the CP ARS to listen to, set and change the sound source at steps 823 and 825. At this time, if, for example, the called party is a non-subscriber to the ring back tone replacement service, the called party may subscribe to the service depending on the guidance of the CP ARS.

As described above, the calling terminal subscriber gifts his or her title song or ring back tone replacing sound to the called party as the sound source of the supplementary service of the called party through the above procedure. That is, the service providing system of the present invention prepares the setting of the sound source of the specific supplementary service of the called party to correspond to the service request shortcut key of the calling terminal subscriber. The called party can access the service providing system through the CP ARS to more conveniently set the sound source of the specific supplementary service of the called party to the sound source gifted from the calling party. Further, if the called party is a non-subscriber to the service, the called party can conveniently subscribe to the service depending on the guidance of the accessed CP ARS. In the meantime, if communication service providers to which the calling party and the called party subscribe are different, there should be interworking therebetween. This case is described in detail below.

Figure 10:
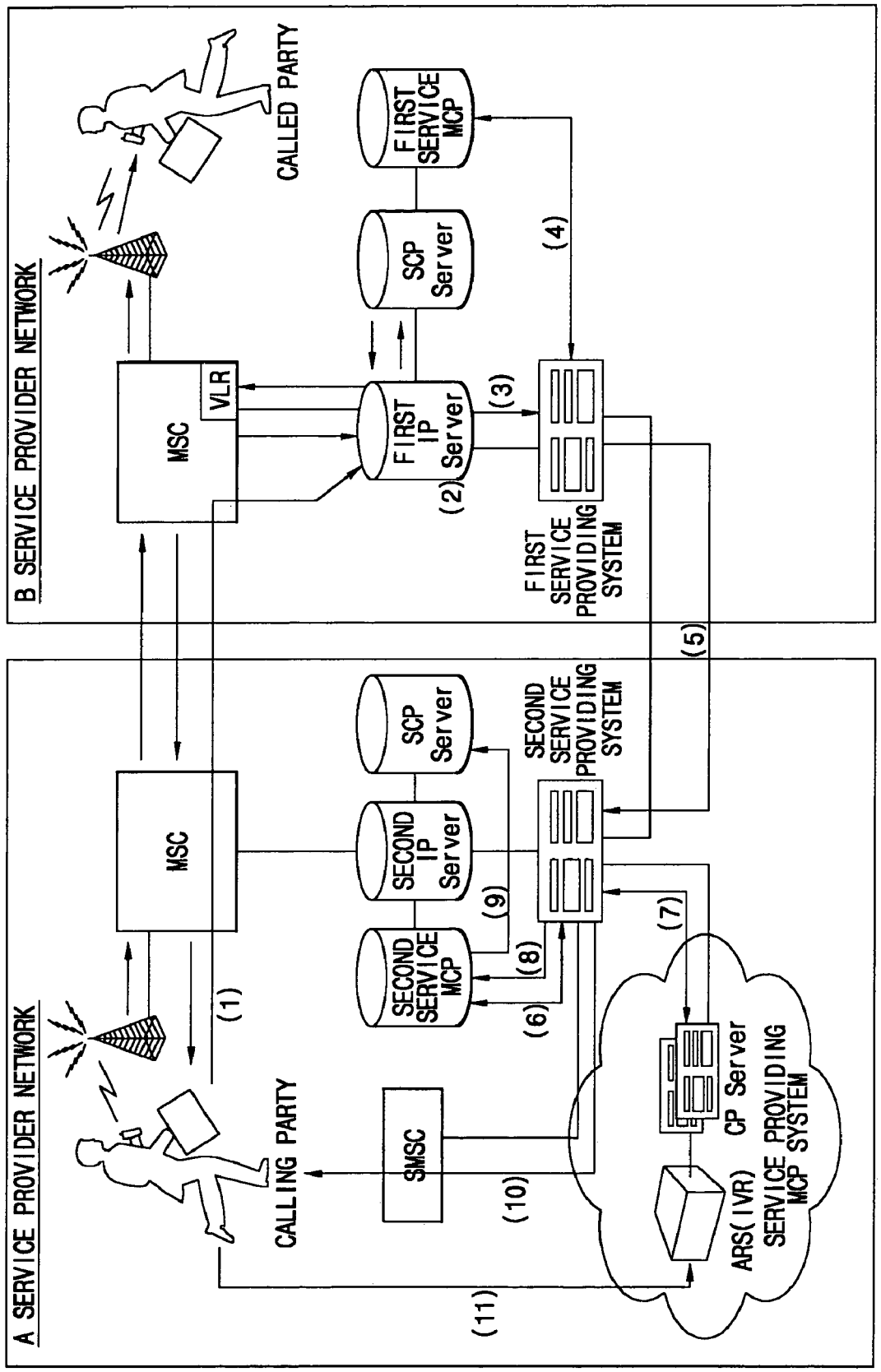
FIG. 10 is a diagram showing a processing method including network interworking in the service according to a first embodiment of the present invention.

FIG. 10 is a diagram showing a service of allowing a calling party to set the sound source of his or her supplementary service to the sound source of the ring back tone replacing sound of a called party having subscribed to another communication network using a DTMF shortcut key during the placing of a call using a mobile phone according to a first embodiment of the present invention. For ease of understanding of this embodiment, numerals (1) to (11) are expressed in FIG. 10.

Referring to FIG. 10, if the calling party places a call to a called party, who has subscribed to a ring back tone replacement service, the calling party listens to the ring back tone replacing sound of the called party depending on a ring back tone replacement service scenario. At this time, if the calling party is impressed thereby the ring back tone replacing sound of the called party and desires to change the ring back tone replacing sound to his or her own service sound source, the calling party presses a DTMF shortcut key for the service sound source contracted between mobile communication service providers on a calling terminal, for example, "1#" used to change a ring back tone replacing sound (1). Then, the service IP server in a communication service provider network (a first communication service provider network), to which the called party subscribes, detects the corresponding shortcut key (2). The service IP server transmits information on a calling party phone number (calling party MIN), a called party phone number (called party MIN), a ring back tone replacing sound code, and a DTMF shortcut key, which the service IP server collects for a current service, to a first service providing system in the first communication service provider network (3).

Next, the first service providing system, having received the collected information from the service IP server, analyzes the information (DTMF key analysis) and transmits the analyzed results to the ring back tone replacement MCP (a first MCP) of the called party (4). The first MCP extracts the name of a singer and the title of a song of the corresponding ring back tone replacing sound code, and transmits the extracted information to the first service providing system. Thereafter, the first service providing system transmits the collected information (for example, calling party/called party information including calling party MIN/called party MIN) and the singer name and song title corresponding to the ring back tone replacing sound of the called party to a second service providing system in a communication service provider network (a second communication service provider network) to which the calling party subscribes (5).

Next, the second service providing system transmits information indicating whether the calling party subscribes to the corresponding service and sound source information to the second MCP while interworking with a corresponding service MCP (for example, the ring back tone replacement MCP of the calling party: a second MCP), thus requesting a sound source code corresponding to the name of a singer and the title of a song for the ring back sound replacing sound of the called party from the second MCP (6). The second service providing system transmits sound source information, including the sound source code corresponding to the singer name and the song title, to the CP server in the second communication service provider network, and receives a new sound source code to be used for the supplementary service of the calling party from the CP server (7). Thereafter, the second service providing system requests the second MCP to change the service sound source using the calling party information and the received new sound source code (8). If the calling party is a non-subscriber to the service, the service providing system allows the calling party to automatically subscribe to the ring back tone replacement service. Further, the second MCP requests the SCP server to change the sound source of the calling terminal subscriber (9). Further, the second service providing system notifies the calling terminal of the sound source change results using SMS after transmitting billing information to the IDR server for billing processing (10). If the calling party does not subscribe to the corresponding service yet, the second service providing system allows the calling party to automatically subscribe to the service, and then notifies the calling terminal of subscription contents together with sound source change contents using SMS. Then, the calling party accesses the CP ARS after a telephone conversation to listen to the sound source and confirm the change of the sound source.

Figure 11:
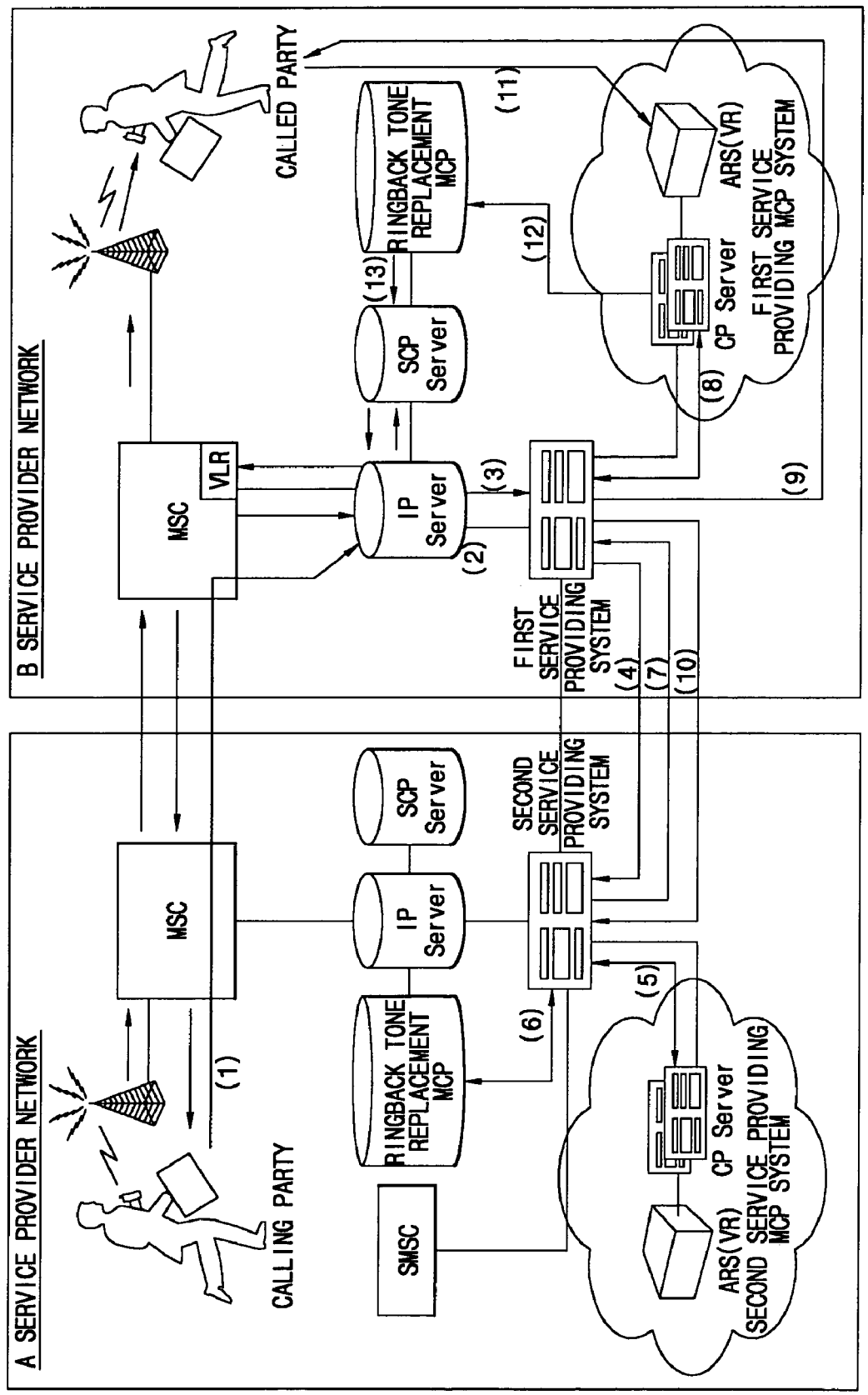
FIG. 11 is a diagram showing a processing method including network interworking in the service according to a first embodiment of the present invention.

FIG. 11 is a diagram showing a service of allowing a calling party to gift his or her preset title song or ring back tone replacing sound to a called party, having subscribed to another communication network, as the supplementary service sound source of the called party through the use of a DTMF shortcut key during the placing of a call using a mobile phone according to a first embodiment of the present invention. For ease of understanding of this embodiment, numerals (1) to (13) are expressed in FIG. 11.

Referring to FIG. 11, if the calling party places a call to a called party having subscribed to a ring back tone replacement service, the calling party receives the ring back tone replacing sound of the called party depending on a ring back tone replacement service scenario. In the case where the calling party desires to gift a specific sound source, such as a title song set through the Web/ME (WAP) or ARS by the calling party, or a ring back tone replacing sound to the called party as a supplementary service sound source, the calling party presses a shortcut key for a service sound source on a calling terminal, for example, "1*" to change a ring back tone replacing sound (1). Then, a first service IP server in a communication service provider network (a first communication service provider network), to which the called party subscribes, detects the corresponding shortcut key (2). The first service IP server transmits information on a calling party phone number (calling party MIN), a called party phone number (called party MIN), and a ring back tone replacing sound code, which the first service IP server collects for a current service, to a first service providing system in the first communication service provider network (3).

Next, the first service providing system transmits the data received from the first service IP server to a second service providing system in a communication service provider network (a second communication service provider network) to which the calling party subscribes (4). The second service providing system requests and receives the information of the title song of the calling party from a second CP server in the second communication service provider network (5). If the title song of the calling party is registered, the second service providing system transmits the sound source information of the calling party to the first service providing system (7).

Next, the first service providing system requests the title song information of the calling party and the registration of a gift from the first CP server in the first communication service provider network, and receives the sound source code of a corresponding sound source (8). Further, the first service providing system notifies the called party of a message indicating the setting request for the sound source or the receipt of the gift of the sound source using SMS (9). Thereafter, the first service providing system transmits information, indicating that the gift of the sound source has been given, to the second service providing system (10). The called party having received the SMS message accesses the CP ARS in the first communication service provider network to subscribe to the service and listen to and set the sound source (11).

In the meantime, after the procedure (5), if the title song of the calling party is not registered, the second service providing system transmits calling party information to the calling party's MCP in the second communication service provider network, and then receives the name of a singer and the title of a song corresponding to the ring back tone replacing sound of the calling party (6). Further, the second service providing system transmits the sound source information, including the name of the singer and the title of the song, to the CP server in the second communication service provider network and then receives a sound source code to be used for the supplementary service. Thereafter, the second service providing system requests the calling party's MCP to change the sound source using the calling party information and the received sound source code. Next, procedures (7) to (11) are performed in the same manner as those of the above-embodiment.

Further, if the supplementary service of the called party requested by the calling party at the above procedure (8) is a ring back tone replacement service, the first CP server requests the called party's MCP, that is, the ring back tone replacement MCP of the called party side in this case, to set/change the sound source of the ring back tone replacement sound of the called party (12). Then, the called party's MCP requests the first SCP server in the first communication service provider network to set/change the sound source of the ring back tone replacing sound of the called party.

Figure 12:
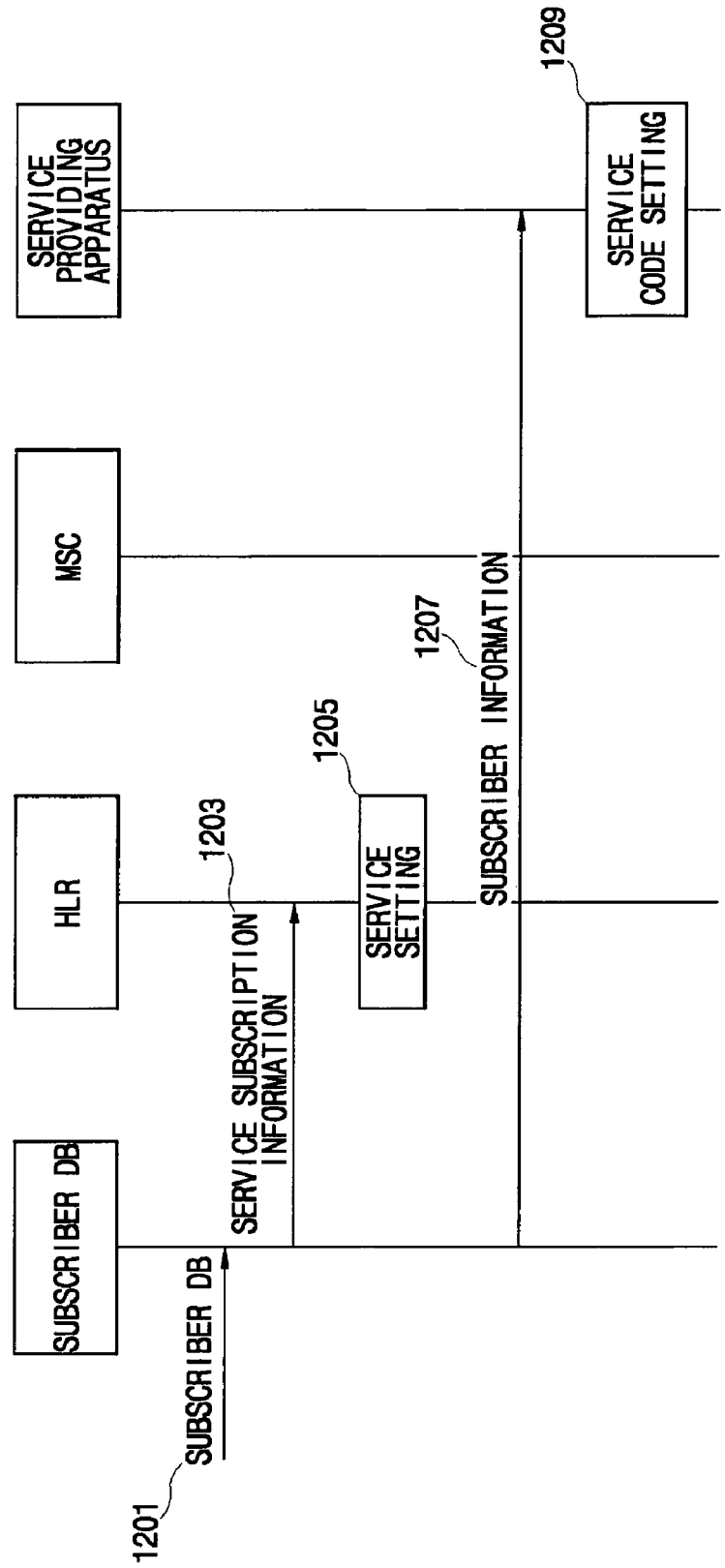
FIG. 12 is a signal flowchart showing a subscription procedure for a sound source change service according to a first embodiment of the present invention.

FIG. 12 is a signal flowchart showing a subscription procedure for a sound source change service according to a first embodiment of the present invention.

Referring to FIG. 12, if a calling terminal subscriber requests a subscription to the communication supplementary service of the present invention (sound source change service) at step 1201, information indicating whether the calling terminal subscriber subscribes to the service may be stored in a subscriber database (DB). Thereafter, the subscriber DB transmits service subscription information, including at least calling terminal identifier provided from the calling terminal subscriber when subscribing to the sound source change service, to a Home Location Register (HLR) at step 1203. The HLR sets the sound source change service in the profile of a corresponding calling terminal subscriber on the basis of the received service subscription information at step 1205. Further, the subscriber DB transmits the subscriber information of the calling terminal subscriber, who has applied for the sound source change service of the present invention, to the service providing apparatus at step 1207. The service providing apparatus sets a sound source change service code using the received subscriber information at step 1209. The sound source change service code corresponds to at least one piece of subscriber information set by the user.

Figure 13:
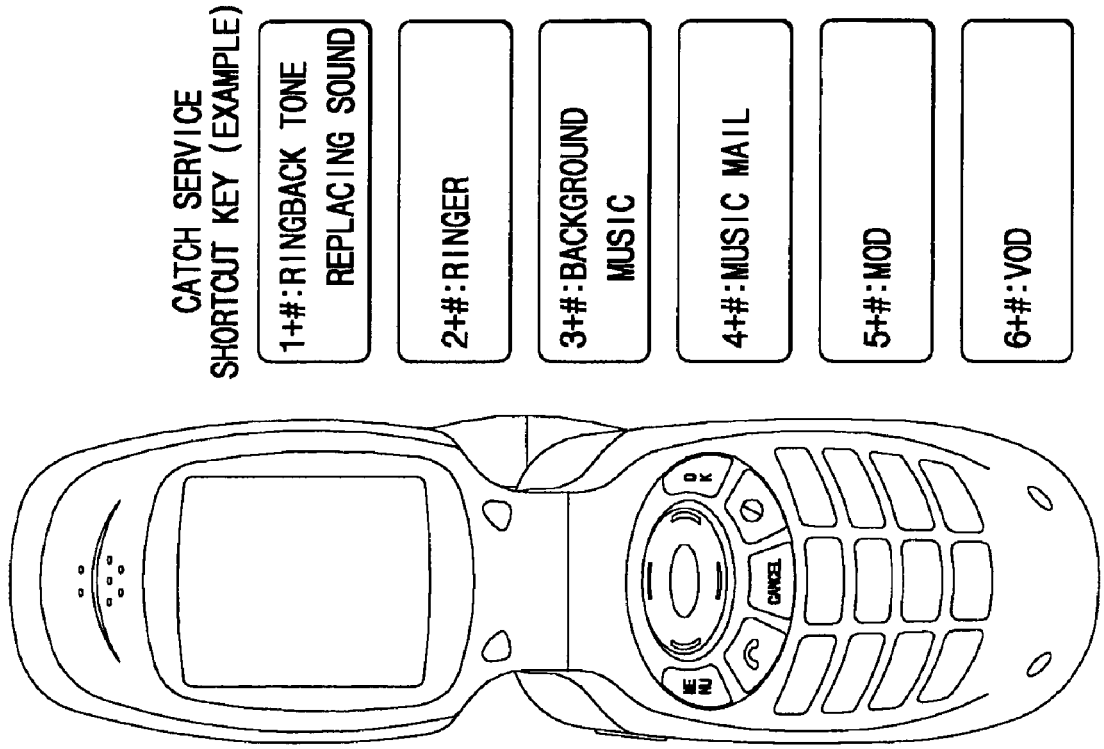
FIG. 13 is a view showing shortcut keys for the service according to a first embodiment of the present invention.

FIG. 13 is view showing a method of utilizing the sound source change service according to a first embodiment of the present invention.

Referring to FIG. 13, a calling terminal subscriber sets DTMF shortcut keys for the sound source change service on the calling terminal thereof. That is, the calling terminal subscriber sets the shortcut keys so as to use them for a service of changing the sound source of at least one supplementary service of the calling terminal subscriber to the ring back tone replacing sound of the called party (hereinafter referred to as a "first sound source change service). For example, shortcut keys for the first sound source change service includes a shortcut key "1+#" used to change the sound source of a ring back tone replacement service to the sound source of the ring back tone replacing sound of the called party, a shortcut key "2+#" used to change the sound source of a ringer to the sound source of the ring back tone replacing sound of the called party, a shortcut key "3+#" used to change the sound source of background music to the sound source of the ring back tone replacing sound of the called party, a shortcut key "4+#" used to change the sound source of a music mail to the sound source of the ring back tone replacing sound of the called party, a shortcut key "5+#, used to change the sound source of MOD to the sound source of the ring back tone replacing sound of the called party, and a shortcut key "6+#" used to change the sound source of VOD to the sound source of the ring back tone replacing sound of the called party.

Further, the calling terminal subscriber sets shortcut keys used to set the sound source change service or to gift a sound source on or to the called terminal of an opposite party. That is, the calling terminal subscriber sets the shortcut keys to use them for a service of gifting the title song or ring back tone replacing sound of the calling terminal subscriber to the called party as at least one supplementary service sound source of the called party (hereinafter referred to as a "second sound source change service"). For example, the shortcut keys for the second sound source change service include a shortcut key "1+*" used to set the sound source of the ring back tone replacing sound of the called party to the sound source of the title song or ring back tone replacing sound of the calling party, a shortcut key "2+*" used to set the sound source of the ringer of the called party to the sound source of the title song or ring back tone replacing sound of the calling party, a shortcut key "3+*" used to set the sound source of the background music of the called party to the sound source of the title song or ring back tone replacing sound of the calling party, a shortcut key "4+*" used to set the sound source of the music mail of the called party to the sound source of the title song or ring back tone replacing sound of the calling party, a shortcut key "5+*" used to set the sound source of MOD of the called party to the sound source of the title song or ring back tone replacing sound of the calling party, and a shortcut key "6+*" used to set the sound source of VOD of the called party to the sound source of the title song or ring back tone replacing sound of the calling party.

As described above, the present invention defines the DTMF shortcut keys on the calling terminal so as to use the sound source change services. In the meantime, such a shortcut key may be added or changed depending on the definition of the services. The above-described supplementary services include at least one supplementary service, to which the calling or called terminal subscriber subscribes through at least one specific communication service provider. The setting information for the supplementary services may be stored in the database of a corresponding contents provider or master contents provider, or a database system, such as SCP. For example, the supplementary service setting information is set with respect to the calling or called terminal subscriber, as shown in Table 2.

TABLE 2

| Service name | Service code | Sound source code | Sound source title | Sound source singer name |
| --- | --- | --- | --- | --- |
| Ring back tone replacing sound | A1 | A 0001 | Mountain birds | AA |
| Ringer | A2 | A 0002 | Sea | AB |
| Background music | A3 | A 0003 | Sky | AC |
| Music mail | A4 | A 0004 | River | AD |
| Morning call | A5 | A 0005 | Sound | AE |
| MOD | A6 | A 0006 | Song | AF |
| VOD | A7 | A 0007 | Movie | AG |

As shown in Table 2, if the calling or called terminal subscriber subscribes to the ring back tone replacement, ringer, background music, Karaoke, music mail, morning call, MOD and VOD services, the setting information related to the subscribed services is stored in the service providing apparatus or the contents provider server. The ringer, Karaoke and music mail services may be used without separate subscriptions to services. Such a supplementary service can be very conveniently set or gifted by allowing the calling terminal subscriber to only press the shortcut keys on the calling terminal through the sound source change services of the present invention.

Figure 14:
FIG. 14 is a view showing a title song for the service according to a first embodiment of the present invention.

FIG. 14 is a view showing a title song according to a first embodiment of the present invention.

Referring to FIG. 14, a calling terminal subscriber may set his or her title song through a title song management means, such as an Internet personal field 1401 used to manage the sound sources of sound source change services, and utilize the sound source change services of the present invention through the use of the title song management means. For example, the calling terminal subscriber can gift his or her title song to the called party as the supplementary service sound source of the called party while registering and managing the title song through the Web/WAP (ME) or the ARS system using the title song management means provided from a service providing system. In the meantime, the title song may be designated according to service types in such a way that, if there is a single title song, it is set to a representative title song, while if there are a plurality of title songs, the title songs can be set with respect to respective services. For example, if the title songs are two or more, the calling terminal subscriber can set the title songs by allocating priorities to the title songs or classifying the title songs according to time bands or prefixes with respect to sound source change services. In the present embodiment, a first title song 1403 and a second title song 1405 are registered, and a priority is allocated to the first title song 1403. Further, if a plurality of title songs are registered, a priority can be set and changed by each subscriber having subscribed to the service.

As described above, the calling terminal subscriber can select/listen to/manage his or her title songs using the wired Internet, the wireless Internet, the Automatic Response System (ARS), etc. Further, the calling terminal subscriber can conveniently gift his or her sound source to the called party using the title song management system. Moreover, in the present invention, even a calling terminal subscriber, who is a non-subscriber to the sound source change services of the present invention, can use the services at the same time to automatically subscribe to the sound source change services. In this case, it is preferable to perform a separate confirmation procedure, such as the notification of an SMS message to the non-subscriber.

Second Embodiment

Figure 15:
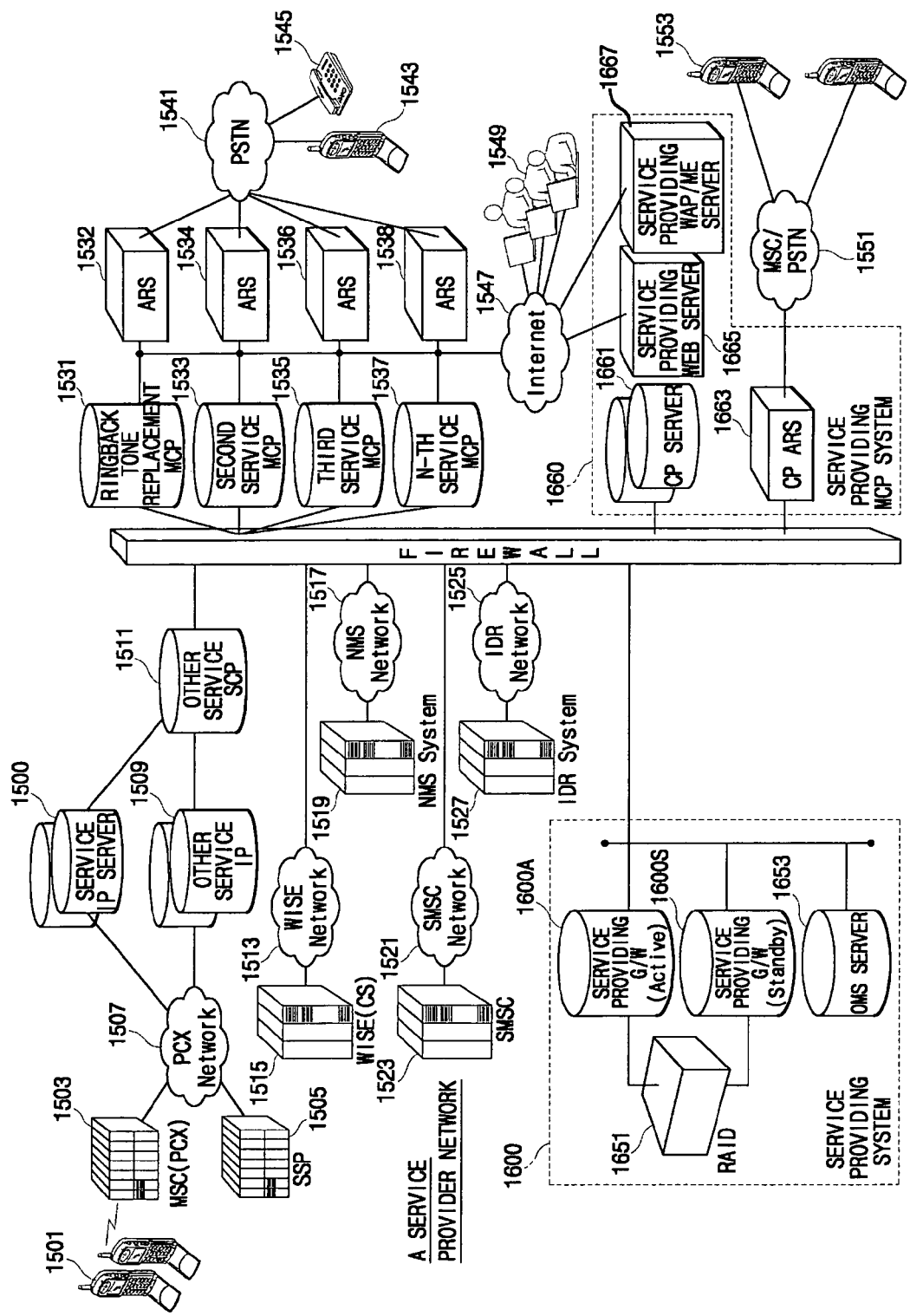
FIG. 15 is a view schematically showing the construction of a communication network to which a service according to a second embodiment of the present invention is applied.

FIG. 15 is a view schematically showing the construction of a communication network to which a service according to a second embodiment of the present invention is applied.

Referring to FIG. 15, the communication network according to the second embodiment of the present invention includes at least an MSC 1503 and a HLR as components constituting the communication network. Further, in order to provide specific supplementary services, such as a ring back tone replacement service and a background music service, the communication network includes a SCP 1511 that manages the subscribers to the ring back tone replacement/the background music services, and the codes of ring back tone replacing sounds and background music, and an Intelligent Peripheral (IP) 1509 that plays a ring back tone replacing sound to a calling party. Further, the communication network includes a plurality of MCPs 1531, 1533, 1535 and 1537 that register the sound sources of the respective supplementary services and manage the files thereof. Further, the communication network performs basic functions while interworking with the IP 1509, a service IP server 1500 which is an intelligent peripheral used to provide the additional communication service according to the second embodiment of the present invention (hereinafter referred to as a "push service"), the MCPs 1531 to 1537 used to provide respective supplementary services, and a service providing MCP system 1660 which is additional equipment used to provide the service of the present invention. In the present specification, the sound source push service includes at least a service of allowing a calling party to compulsorily set the supplementary service sound source of a called party to the supplementary service sound source of the calling party.

In detail, the communication network of the present invention includes an MSC 1503 managing at least one mobile communication terminal 1501, a Service Switching Point (SSP) 1505, the intelligent peripheral 1509 coupled to both the MSC 1503 and the SSP 1505 through a Mobile Switching Center (MSC)/Personal Communication Exchange (PCX) network 1507, the service IP server 1500, and a Service Control Point (SCP) 1511 coupled to both the IP 1509 and the service IP server 1500. The SCP 1511 is coupled to a WISE (CS) 1515, which is a kind of subscriber management server, through a WISE network 1513, which is a kind of subscriber management network, to a Network Management System (NMS) 1519 through a NMS network 1517, to a SMSC 1523 through a SMSC network 1521, and to an Internet Detail Record (IDR) system 1527 through an IDR network 1525.

Further, the communication network includes the plurality of MCPs 1531, 1533, 1535 and 1537 coupled to the SCP 1511. The MCPs 1531 to 1537 are coupled to ARSs 1532, 1534, 1536 and 1538 related to respective services, respectively. The ARSs 1532 to 1538 are coupled to a mobile communication terminal 1543 and a wired telephone 1545 through a mobile communication network or a public switched telephone network (MSC/PSTN) 1541. Further, the MCPs 1531 to 1537 and the ARSs 1532 to 1538 are coupled to at least one Internet user terminal 1549 through the Internet 1547.

Further, the communication network includes a sound source push service providing system 1600 (hereinafter referred to as a "service providing system") that provides a service of allowing a calling party to push his or her service sound source or ring back tone replacing sound as the supplementary service sound source of a called party using a DTMF shortcut key during the placing of a call according to the present invention. The service providing system 1600 is coupled to the service IP server 1500, the SCP 1511 and the MCPs 1531 to 1537. The service providing system 1600 includes a Gateway (G/W) as a basic device. For example, the service providing system 1600 includes a first gateway 1600A and a second gateway 1600S as shown in FIG. 15. In this case, the first and second gateways 1600A and 1600S are operated as active-active servers or active-standby servers.

Further, the service providing system 1600 may include a Redundant Array of Inexpensive Disks (RAID) 1651 coupled to the first and second service providing G/Ws 1600A and 1600S, as shown in FIG. 15. The RAID 1651 represents a device of repeatedly storing the same important data in various devices. If the RAID 1651 is used, data input/output operations are balanced and overlapped, thus improving an entire system performance.

Further, the service providing system 1600 may include an Operation, Administration and Maintenance Server (OA&M server: OMS) 1653 connected to both the first and second gateways 1600A and 1600S. The OMS 1653 has a function of operating and administering the system and executing billing processing and statistical processing at a remote place. The OMS 1653 provides graphic user environments for convenience of operators. The OMS 1653 is comprised of a server that operates/administers the service providing system 200, and subscribers. The OMS 1653 functions as OA&M that performs configuration management, statistics management, operation management and fault management for the service providing system 1600 and the RAID 1651. For this function, the OMS 1653 includes an interworking function with a CP server 1661 and a CP ARS 1663, which will be described later, a Web-based OA&M function, a Man Machine Communication (MMC) and Common Line Interface (CLI) processing function, a system configuration management function, a mapping table code management and statistics inquiry function, a system status and fault management function, and an interworking function with the NMS.

Further, the communication network according to the second embodiment of the present invention includes the contents provider (CP) server 1661 and the CP ARS 1663 connected to the SCP 1511, the MCPs 1531 to 1537, and the service providing system 1600. The CP server 1661 and the CP ARS 1663, adapted to provide the service of the present invention, can be used as a service providing MCP system 1660 to provide the present service. Therefore, the CP server 1661 and the CP ARS 1663 are included in the service providing system 1600 in wider sense. The service providing MCP system 1660 includes a Web server 1665 and a WAP/ME server 1667 connected to the Internet. The CP ARS 1663 may be connected to at least one telephone terminal 1553 through the mobile communication network/public switched telephone network 1551.

When a calling party pushes his or her service sound source as the service sound source of the called party using a DTMF signal, the CP server 1661 functions to change the service sound source of a called party or the code thereof to correspond to the service sound source of the calling party, provided from the service providing system 1600, using subscriber information and corresponding sound source information while interworking with the service providing system 1600. Further, the CP server 1661 includes a connection protocol processing unit with the service providing system 1600, a sound source managing unit for the sound source push service, a subscriber managing unit for the sound source push service, a code managing unit for sound sources in the service providing system, a code managing unit in the service providing system for service sound sources provided from other service providers, an update functioning unit of the service providing system for sound source codes, a database managing unit that manages a sound source code DB, a sound source push service subscriber information DB, an external CP/MCP information DB and an external CP/MCP sound source code DB, a backup functioning unit, a statistics managing unit that manages protocol message processing statistics, sound source code change statistics according to service providers and system load factor statistics, and a fault management functioning unit that manages the connection failures of the service providing system and system failures.

The CP ARS 1663 allows the called terminal subscriber to listen to the service sound source of the called party subscriber, confirm the setting of the service sound source, or use services, such as gifts for friends, when the called terminal subscriber accesses the service providing system through the sound source push service. For this operation, the CP ARS 1663 includes an interworking function with the service providing system 1600, an interworking function with a MSC based on ITU-T No. 7 signaling and a PSTN exchange based on R2/PRI signaling, a first connection protocol processing function that processes a connection protocol with the CP server 1661, a second connection protocol processing function that processes a connection protocol with at least one MCP providing conventional supplementary services, such as a ring back tone replacement service, a ringer service, a background music service, a Karaoke service, a music mail service, a morning call service, a MOD/VOD service, and a third connection protocol processing function that processes a connection protocol with other external MCPs.

Further, the CP ARS 1663 includes a sound source download and management function for the sound source push service of the present invention, supplementary service functions including the pushing of a selected sound source to a subscriber having subscribed to another service provider, the copy of the sound source of a subscriber having subscribed to another service provider and other supplementary services interworking between network service providers, a statistic function including the statistics of selected sound sources, call processing statistics and system load factor statistics, and a fault management function for system failure management and TCP/IP interworking fault processing. Further, the CP ARS 1663 may process ITU-T No. 7 signaling user part SS7 ISUP and Interactive Voice Response (IVR) functions in the CP ARS server.

In the meantime, the above-described service IP server 1500 is predicted to be placed in the MSC 1503 or the service providing system 1600 with the later technical development of electronic communication equipment. Therefore, the present invention includes an example in which the service IP server 1500 is an independent device, or in which it is an IP functioning unit placed in the MSC 1503 or the service providing system 1600.

Figure 16:
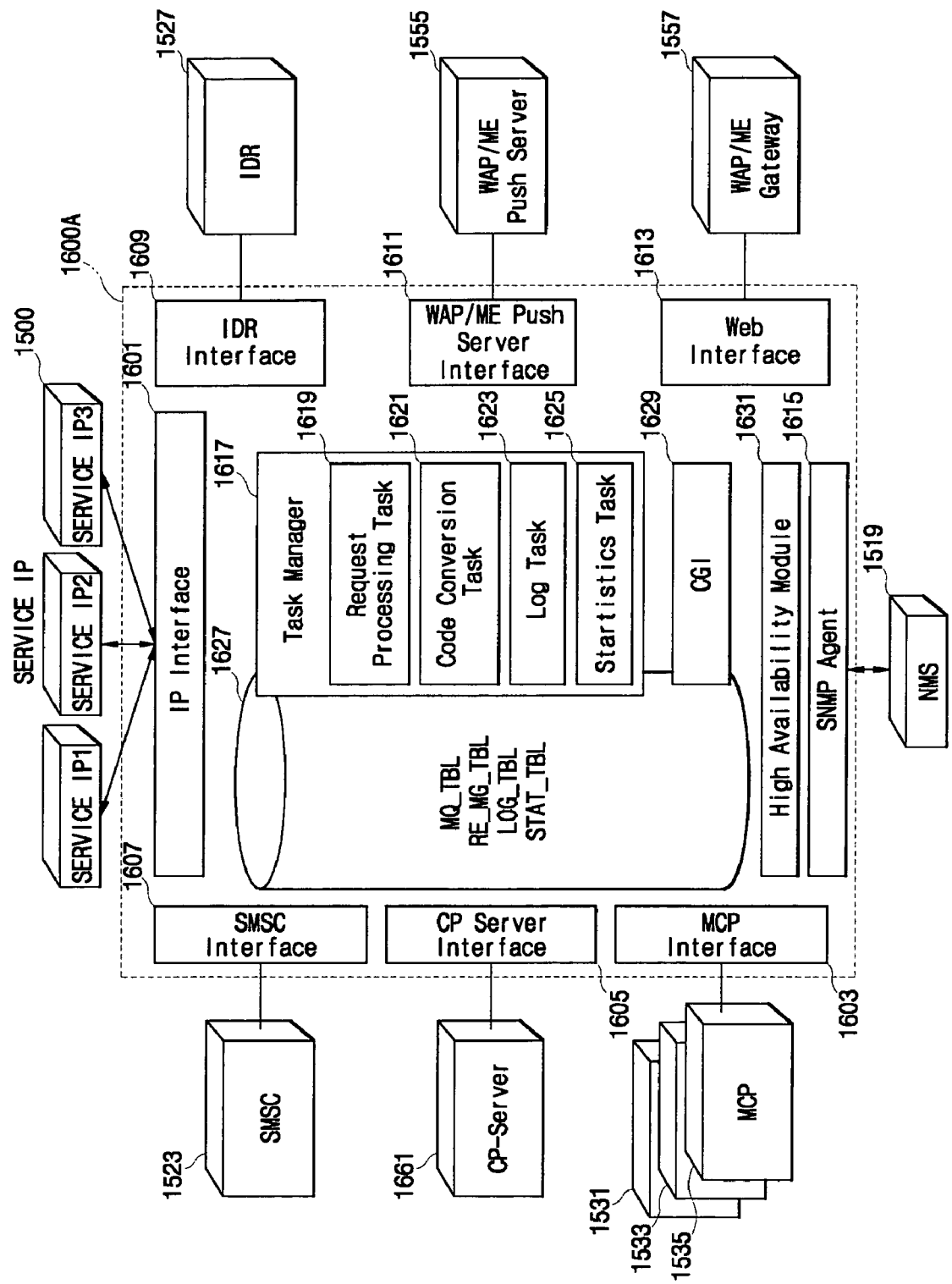
FIG. 16 is a block diagram showing a service proving apparatus according to a second embodiment of the present invention.

FIG. 16 is a block diagram showing a service proving apparatus according to a second embodiment of the present invention.

Referring to FIG. 16, the service providing apparatus according to the second embodiment of the present invention is a service device that allows a calling terminal subscriber to push his or her supplementary service sound source as the supplementary service sound source of a called party using a DTMF shortcut key during the placing of a call. The service providing apparatus 1600A basically includes an external data receiving unit that receives a user signal from at least one external intelligent peripheral (IP), a data processing unit that processes the received data, a database processing unit, a Short Message Service Center (SMSC) interworking processing unit, an Internet Detain record (IDR) interworking processing unit, a Network Management System (NMS) interworking processing unit, a service providing MCP system interworking unit, an external MCP interworking unit and an external data transmitting unit that transmits processed results to another server. The service providing apparatus 1600A of the present invention performs basic functions while interworking with the IP, at least one MCP that provides each supplementary service, the service providing MCP system, which is the additional equipment of the present invention, the CP ARS, which is the ARS of the present invention, and the Web/WAP (ME) for the processing of access to the wired/wireless Internet.

In detail, for parts for transmission/reception of external data, the service providing apparatus 1600A includes an IP interface 1601 coupled to at least one IP 1509, an MCP interface 1603 coupled to the MCPs 1531, 1533 and 1535, a CP server interface 1605 coupled to the CP server 1661, a SMSC interface 1607 coupled to the SMSC 1523, an IDR interface 1609 coupled to the IDR 1527, a WAP/ME push server interface 1611 coupled to a WAP/ME push server 1555, a Web interface 1613 coupled to a WAP/ME gateway 1557, and a Simple Network Management Protocol (SNMP)

agent 1615 connected to the NMS 1519. The above-described SMSC interface 1607 is an interface for short message service notification (SMS notification) according to new subscription. For this operation, the SMSC interface 1607 may use a Short Message Peer-to-Peer (SMPP) protocol. The IDR interface 1609 is an interface interworking with the IDR 1527 for billing for services. The IDR interface 1609 complies with standards defined by respective communication network service providers.

Further, the service providing apparatus 1600A includes a task manager 1617 managing all tasks in the system, a database 1627 connected to the task manager 1617, a Common Gateway Interface (CGI) 1629 connected to the task manager 1617, and a high availability module 1631 increasing the availability of the system. The task manager 1617 includes a request processing task 1619 adapted to request the setting or change of sound sources from the SCP 1511 through the CP server 1661 or the MCPs 1531, 1533 and 1535, a code conversion task 1621 converting the different sound source codes of the respective MCPs into the sound source codes of required supplementary services, a log task 1623 recording a log for tasks performed by the task manager 1617, and a statistics task 1625 processing the statistics of the tasks performed by the task manager 1617.

Through the above-construction, the present invention can provide the following advantages to service users. First, a calling terminal subscriber having subscribed to the present service can compulsorily set at least one supplementary service sound source of a called party to at least one supplementary service sound source of the calling party in real time using a DTMF shortcut key while listening to the ring back tone replacing sound set by the called party at the time of attempting each call. Second, a calling terminal user, who does not subscribe to the service, can immediately subscribe to the service and push his or her sound source as the sound source of the called party in real time by pressing a specific DTMF shortcut key while listening to the ring back tone replacing sound at the time of attempting each call. At this time, the present service provider preferably ensures the confirmation of the subscription of the calling terminal user to the service using SMS or the like. Third, a calling terminal subscriber pushes at least one of supplementary service sound sources, such as a title song, a ring back tone replacing sound, a ringer sound source, a background music sound source, a music mail sound source, etc., which are preset by the calling terminal subscriber, as at least one supplementary service sound source of the called party using a DTMF shortcut key at the time of attempting each call. Accordingly, the called party can immediately use the sound source of the calling terminal subscriber as his or her supplementary service sound source.

Further, the present invention can provide the following advantages to communication service providers. First, a mobile communication service provider can yield additional profits due to the inducement of new subscription to supplementary services and the increased number of subscribers. Second, the mobile communication service provider, the MCP and the CP provide environments in which a subscriber can frequently change his or her supplementary service sound source, and then increase additional profits due to the change/reuse of the sound sources. Third, the inducement of the new subscription of subscribers, who do not know a method and procedure of subscribing to the service and are incapable of subscribing to the service, can be increased.

Figure 17:
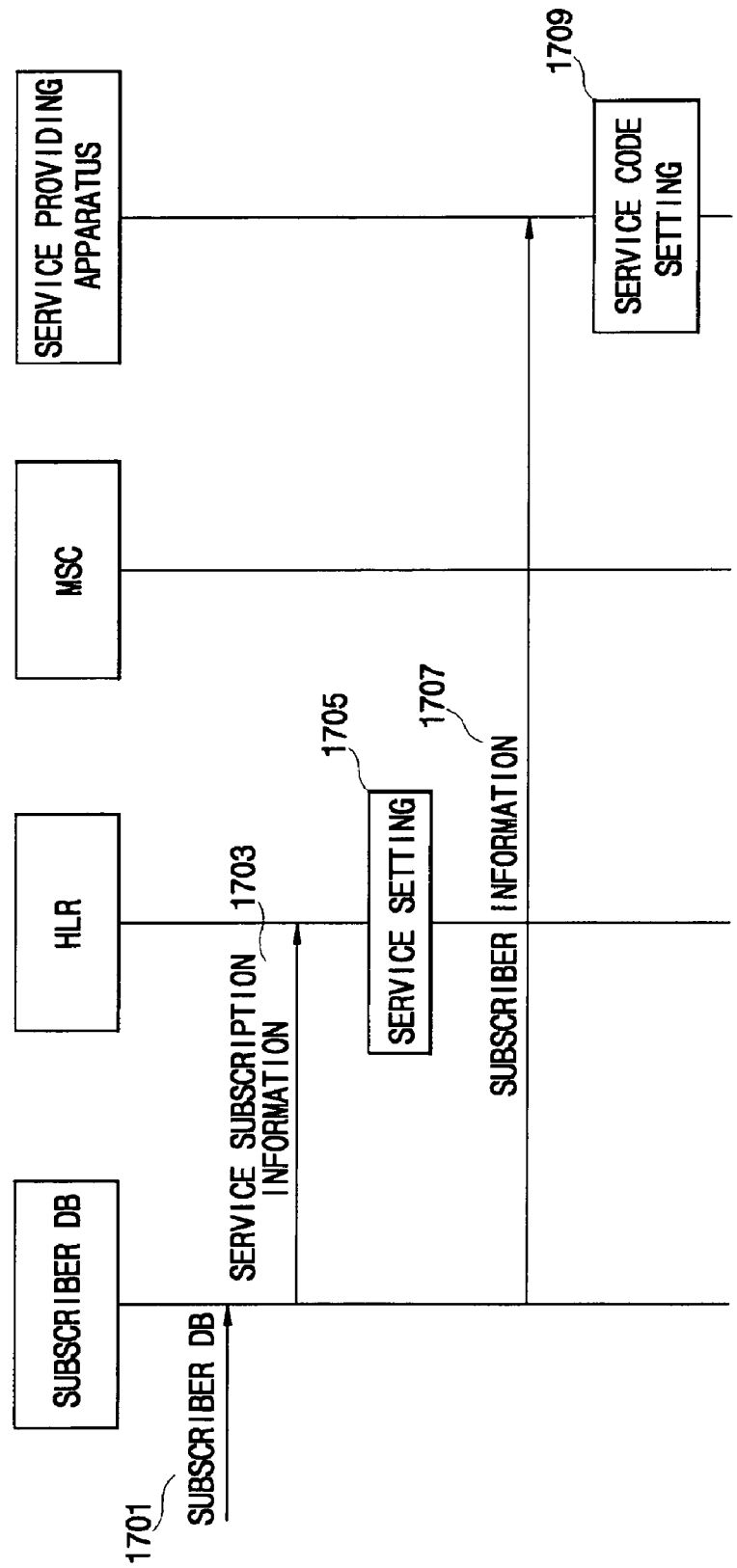
FIG. 17 is a signal flowchart showing the subscription procedure of a sound source push service according to a second embodiment of the present invention.

FIG. 17 is a signal flowchart showing the subscription procedure of the sound source push service according to a second embodiment of the present invention.

Referring to FIG. 17, if a calling terminal user requests a subscription to the supplementary service of the present invention (sound source push service) at step 1701, whether the calling terminal user subscribes to the service is stored in the subscriber database DB. Thereafter, the subscriber DB transmits service subscription information including at least calling terminal identifier, provided from the calling terminal user when subscribing to the sound source push service, to a Home Location Register (HLR) at step 1703. The HLR sets the sound source push service on the profile of the corresponding calling terminal subscriber on the basis of the received service subscription information at step 1705. Further, the subscriber DB transmits the subscriber information of the calling terminal subscriber, having applied for the sound source push service of the present invention, to the service providing apparatus at step 1707. Further, the service providing apparatus sets a sound source push service code using the received subscriber information at step 1709. The sound source push service code corresponds to at least one piece of subscriber information set by the user. As described above, the calling terminal user can subscribe to the present service through the wired/wireless Internet, the ARS, an agency/customer center, etc., and then push his or her service sound source as the service sound source of a called party.

Figure 18:
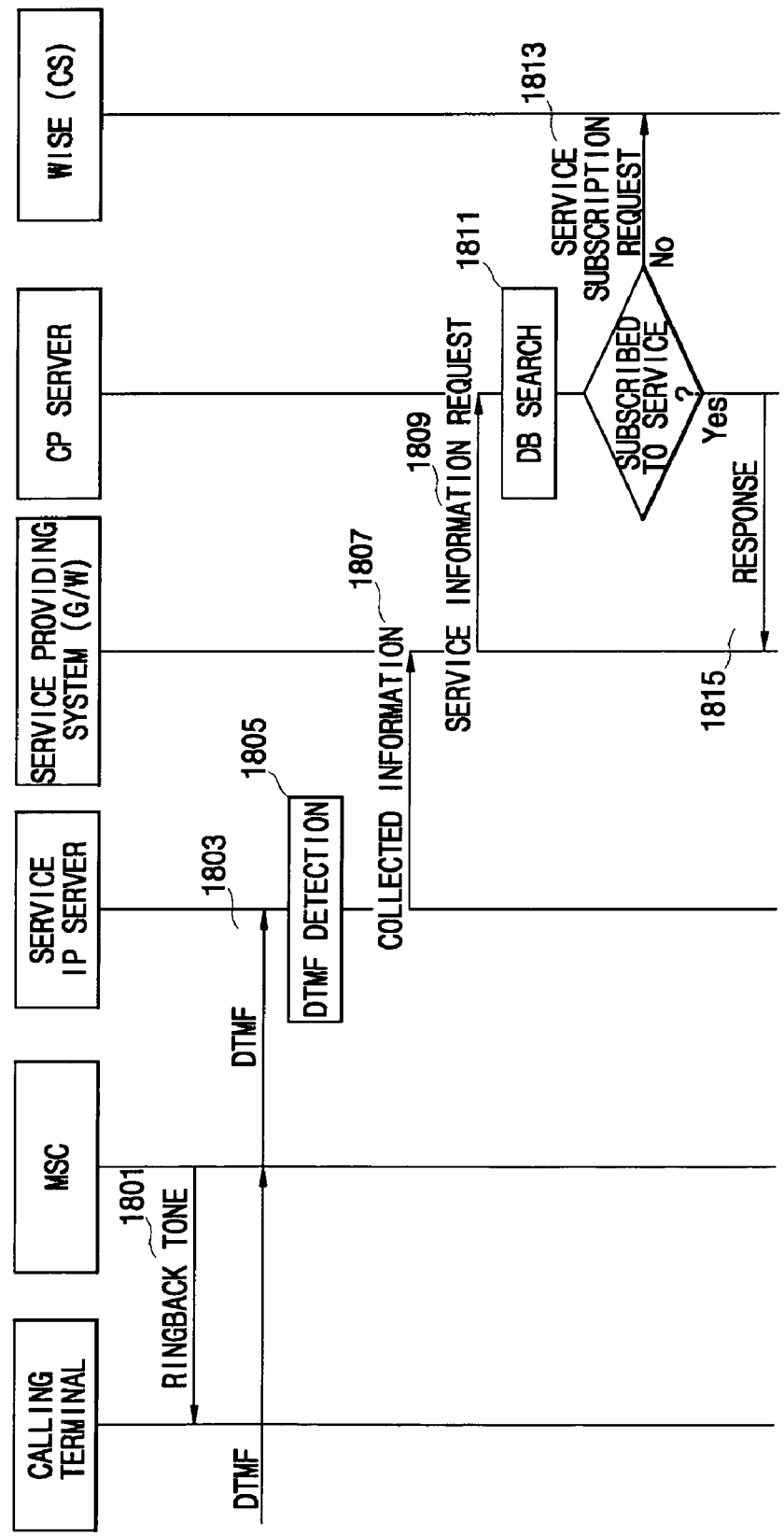
FIG. 18 is a signal flowchart of a process of setting a service sound source in the sound source push service according to a second embodiment of the present invention.

FIG. 18 is a signal flowchart of a process of setting a service sound source in the sound source push service according to a second embodiment of the present invention. In this embodiment, a procedure of automatically subscribing to the present service is described.

Referring to FIG. 18, while listening to the ring back tone replacing sound of a called party after calling the called party at step 1801, a calling party presses a DTMF shortcut key on a calling terminal so as to push his or her set supplementary service sound source as the sound source of a supplementary service preset by the called party. At this time, the DTMF shortcut key signal of the calling terminal is transmitted to a service IP server through a MSC in a communication network at step 1803. The service IP server recognizes the received DTMF signal as an intelligent network service call, and detects the DTMF shortcut key signal at step 1805. Thereafter, the service IP server transmits collected information, including a calling terminal identifier corresponding to a calling terminal, a called terminal identifier corresponding to a called terminal, sound source information for the ring back tone replacing sound, and the DTMF shortcut key information, to the service providing system at step 1807.

The service providing system requests from the CP server information, indicating whether the supplementary service sound source selected through the push service by the calling party exists, and the supplementary service sound source at step 1809. In this case, the CP server includes the service providing MCP system that provides the service according to the second embodiment of the present invention. The CP server searches the subscriber database for information indicating whether the calling and called parties subscribe to the present service through the use of data including the subscriber information of the calling terminal identifier and the called terminal identifier, received from the service providing system, at step 1811. If the calling or called party does not subscribe to the present service, the CP server requests the WISE (Customer care System: CS) of a communication service provider to allow the calling or called party to subscribe to the service at step 1813. Further, the CP server responds to the request from the service providing system at step 1815.

As described above, in the present invention, the service providing system automatically performs a service subscription procedure even though the calling or called party does not subscribe to the present service yet. Through the above procedure, the calling party can push his or her at least one supplementary service sound source or ring back tone replacing sound source, or a basic sound source provided from the present service provider, as at least one supplementary service sound source of the called party through the wired/wireless Internet of the Web/WAP (ME) and the ARS, or compulsorily set at least one supplementary service sound source of the called party to at least one service sound source of the calling party.

Figure 19:
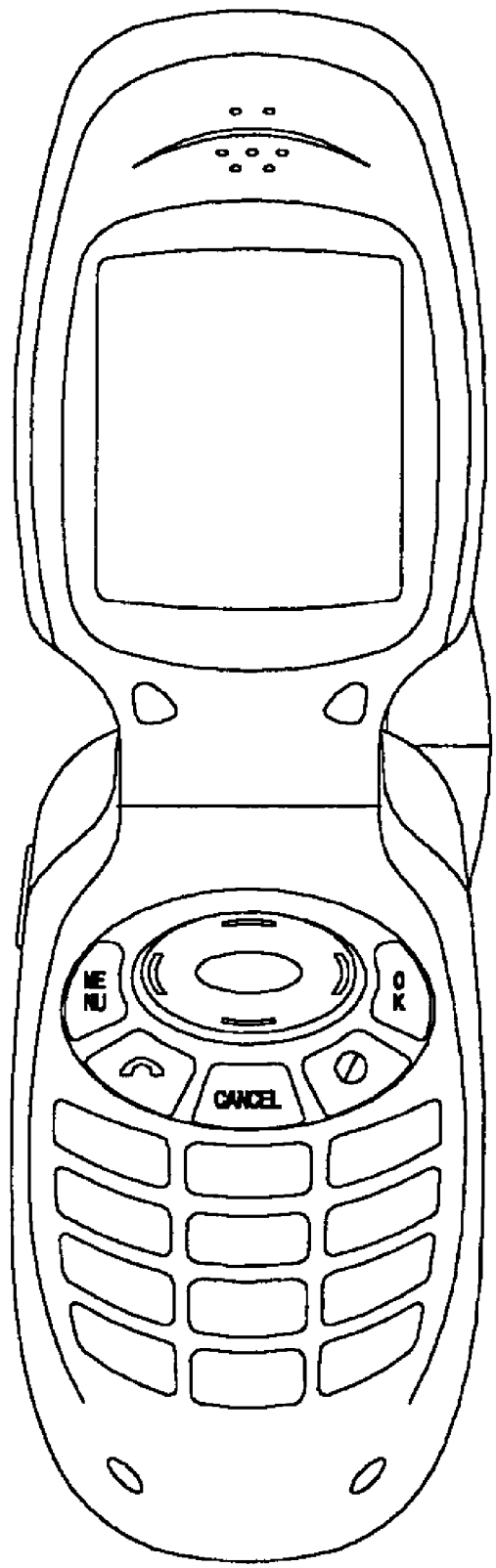
FIG. 19 is a view showing the definition of shortcut keys for the sound source push service according to a second embodiment of the present invention.

FIG. 19 is a view showing the definition of shortcut keys for the sound source push service according to a second embodiment of the present invention.

Referring to FIG. 19, the calling terminal subscriber uses shortcut keys on a calling terminal so as to push the sound source of his or her supplementary services, such as a title song, ring back tone replacing sound, ringer, background music, music mail, MOD and VOD, as at least one supplementary service sound source of the called party. For example, if sound sources set by the calling party correspond to service types, that is, if the calling party respectively sets the service sound sources, such as the ring back tone replacing sound source, ringer sound source, and background music sound source, the shortcut keys for the sound source push service may be used in such a way that a shortcut key "1+*" is used to set the ring back tone replacing sound source of the called party to the ring back tone replacing sound source of the calling party, a shortcut key "2+*" is used to set the ringer sound source of the called party to the ringer sound source of the calling party, a shortcut key "3+*" is used to set the background music sound source of the called party to the background music sound source of the calling party, a shortcut key "4+*" is used to set the music mail sound source of the called party to the music mail sound source of the calling party, a shortcut key "5+*" is used to set the MOD sound source of the called party to the MOD sound source of the calling party, and a shortcut key "6+*" is used to set the VOD sound source of the called party to the VOD sound source of the calling party.

Further, if the service sound source (title song) set by the calling party is composed of a single sound source or if the calling party uses his or her ring back tone replacing sound as the title song (service sound source) without setting the service sound source, shortcut keys for the sound source push service may be used in such a way that a shortcut key "1+*" is used to set the ring back tone replacing sound source of the called party to the service sound source of the calling party, a shortcut key "2+*" is used to set the ringer sound source of the called party to the service sound source of the calling party, a shortcut key "3+*" is used to set the background music sound source of the called party to the service sound source of the calling party, a shortcut key "4+*" is used to set the music mail sound source of the called party to the service sound source of the calling party, a shortcut key "5+*" is used to set the MOD sound source of the called party to the service sound source of the calling party, and a shortcut key "6+*" is used to set the VOD sound source of the called party to the service sound source of the calling party.

The definition and example of the above-described shortcut keys are summarized and shown in Table 3. The definition of the shortcut keys for the sound source push service, or the definition of the service may be changed with the operations of the service. Further, the definition may be extended depending on the addition of services. Further, the calling terminal subscriber can freely change and set the shortcut keys for the sound source push service within an allowable range defined by a service operator.

TABLE 3

| DTMF shortcut key | Service item |
| --- | --- |
| 1+* | Ring back tone replacing sound source push |
| 2+* | Ringer sound source push |
| 3+* | Background music sound source push |
| 4+* | Music mail sound source push |
| 5+* | MOD sound source push |
| 6+* | VOD sound source push |

As shown in Table 3, in the sound source push service of the present invention, the calling party can immediately set/change the sound source of the specific supplementary service of a called party, selected by the calling party, to the supplementary service sound source of the calling party by pressing a specific DTMF shortcut key on the calling terminal during the placing of a call. For example, if the calling party requests the sound source push service by pressing the shortcut key "1+*" on the calling terminal during the placing of a call, the service sound source set by the calling party using the sound source push service is pushed as the supplementary service sound source of the called party. This method may be more efficiently used in the case where the called subscriber does not know how to use a method of subscribing to the supplementary service and changing a service sound source.

Figure 20:
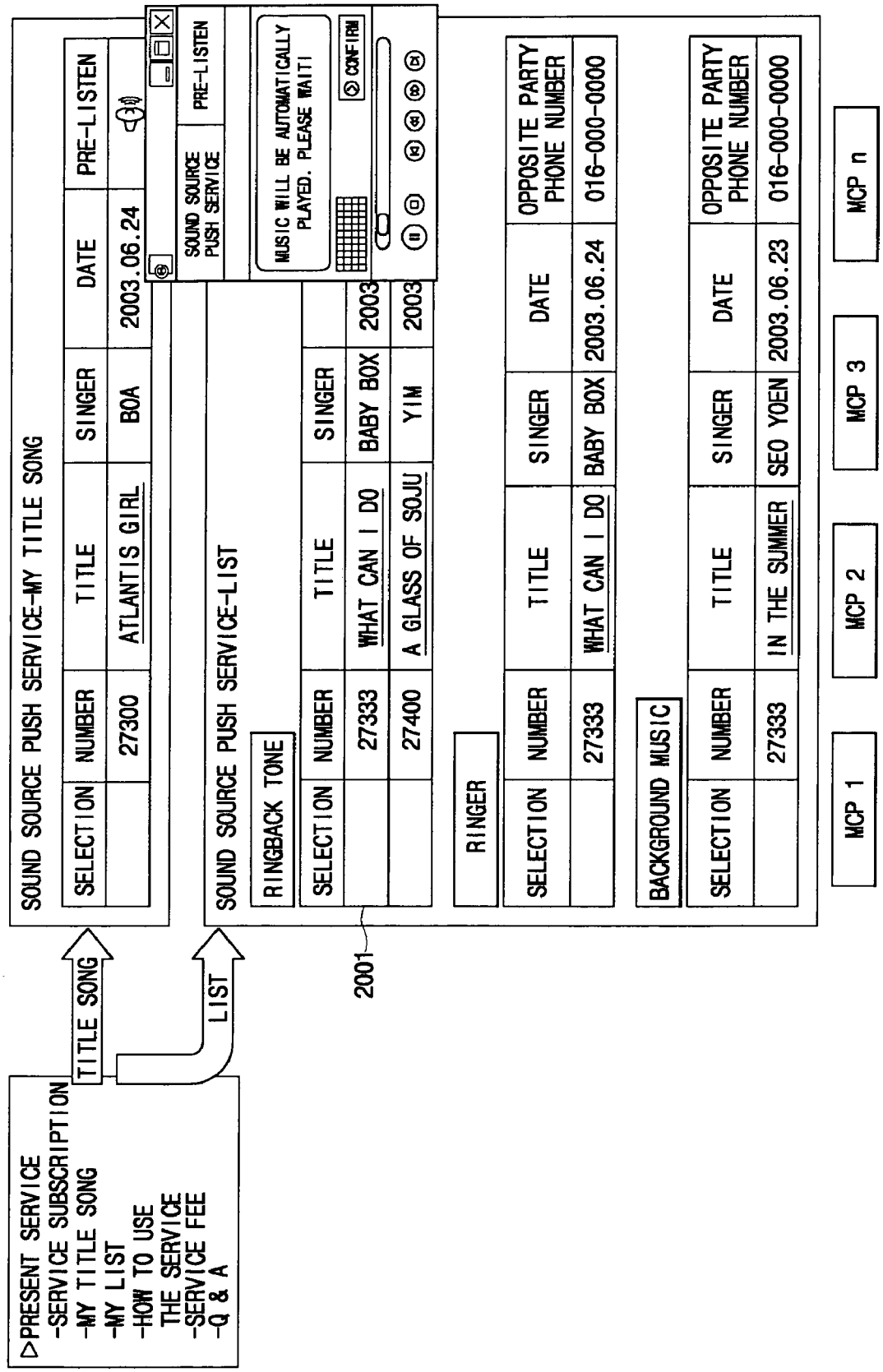
FIG. 20 is a view showing the subscription to the sound source push service and the setting of service sound sources, and the list of sound sources pushed to a called party through the wired Internet in the sound source push service according to a second embodiment of the present invention.
Figure 21:
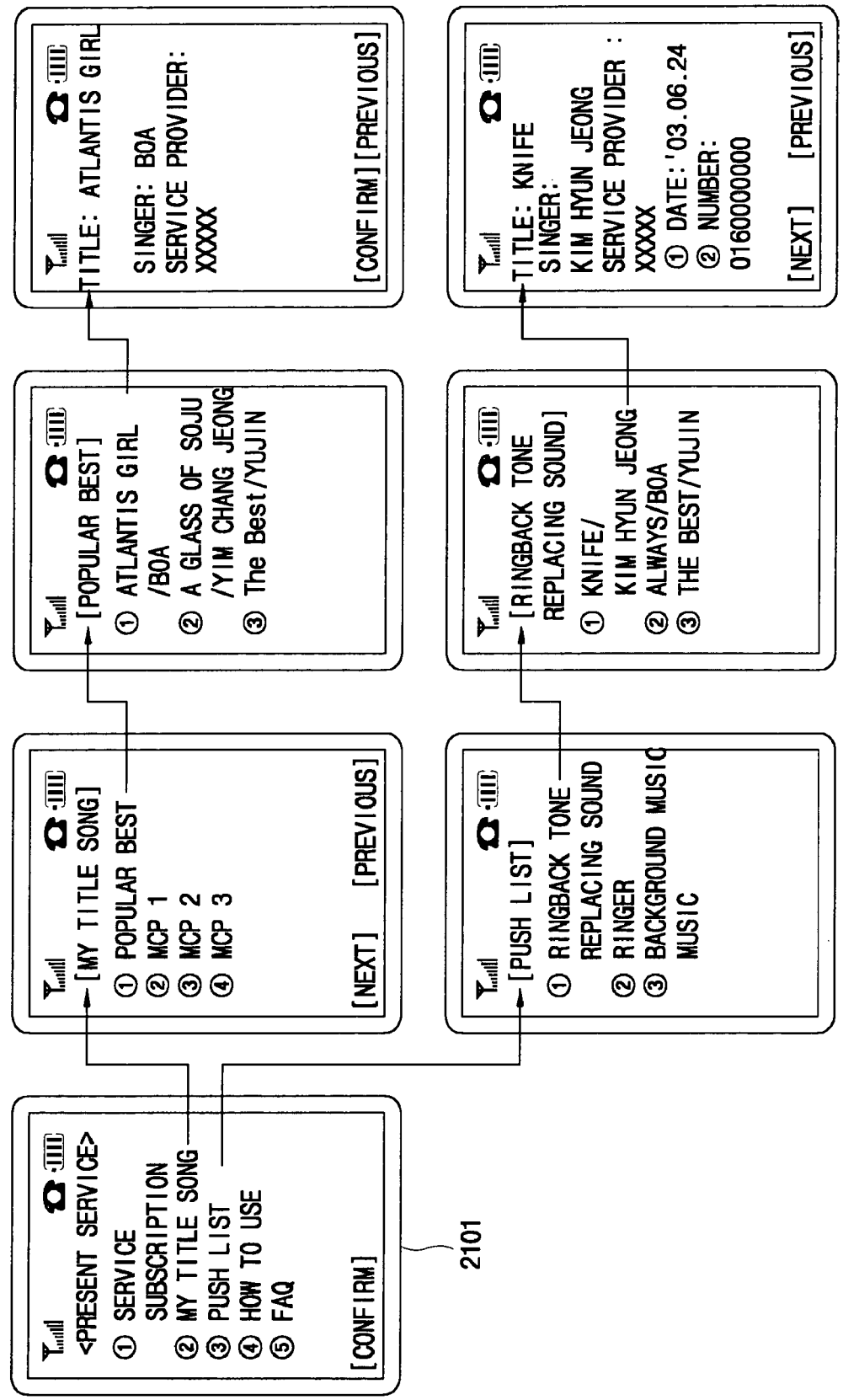
FIG. 21 is a view showing the subscription to the sound source push service and the setting of service sound sources, and the list of sound sources pushed to a called party through the wireless Internet in the sound source push service according to a second embodiment of the present invention.

FIG. 20 is a view showing the subscription to the sound source push service and the setting of service sound sources, and the list of sound sources pushed to a called party through the wired Internet in the sound source push service according to a second embodiment of the present invention. FIG. 21 is a view showing the subscription to the sound source push service and the setting of service sound sources, and the list of sound sources pushed to a called party through the wireless Internet in the sound source push service according to a second embodiment of the present invention.

Referring to FIG. 20, a subscriber having subscribed to the present service can designate and manage at least one sound source as his or her supplementary service sound source. For example, the subscriber can designate a service sound source provided from the first MCP as his or her service sound source (title song). If the subscriber designates and uses a plurality of service sound sources according to respective services, supplementary service sound sources, such as a ring back tone replacing sound (ring back tone) source provided from the first MCP, a ringer sound source provided from the second MCP, a background music sound source provided from the third MCP, a morning call sound source provided from the fourth MCP, a music mail sound source provided from the fifth MCP, and a MOD/VOD sound source provided from the sixth MCP, are stored in a storage space of the subscriber coupled to the Internet. Further, the subscriber can manage the supplementary service sound sources stored in his or her storage space in the form of a homepage 2001 through the use of the wired/wireless Internet, ARS, etc. At this time, the subscriber can perform pre-listening for the service sound source designated by the subscriber through the wired Internet by clicking a corresponding sound source. Further, in the sound source push service according to the second embodiment of the present invention, dates and opposite parties' phone numbers for transmitted supplementary service sound sources can be recorded and stored at the homepage 2001 provided from the communication service provider, as shown in FIG. 20. In this way, the service sound sources designated by the subscriber are used to be pushed as the supplementary service sound sources of the called party in real time using the DTMF shortcut key during the placing of a call or the listening of a ring back tone replacing sound.

Referring to FIG. 21, as described above, the subscriber having subscribed to the present service can store and manage at least one supplementary service sound source of a ring back tone replacing sound source, a ringer sound source, a background music sound source, a morning call sound source, a music mail sound source and a MOD/VOD sound source provided from at least one MCP, as his or her supplementary service sound source, in his or her storage space accessible by a mobile communication terminal. In this case, the storage space includes a predetermined space within a storage device provided from the service provider to the subscriber. Further, the user can subscribe to the present service, set his or her at least one service sound source, manage the list of service sound sources pushed by the subscriber to the called party, and utilize services, such as the way of using the present service, on a menu screen 2101. In this way, at least one service sound source designated (set) by the subscriber is used to be pushed as the supplementary service sound source of the called party in real time using the DTMF shortcut key during the placing of a call or the listening of a ring back tone replacing sound.

Figure 22:
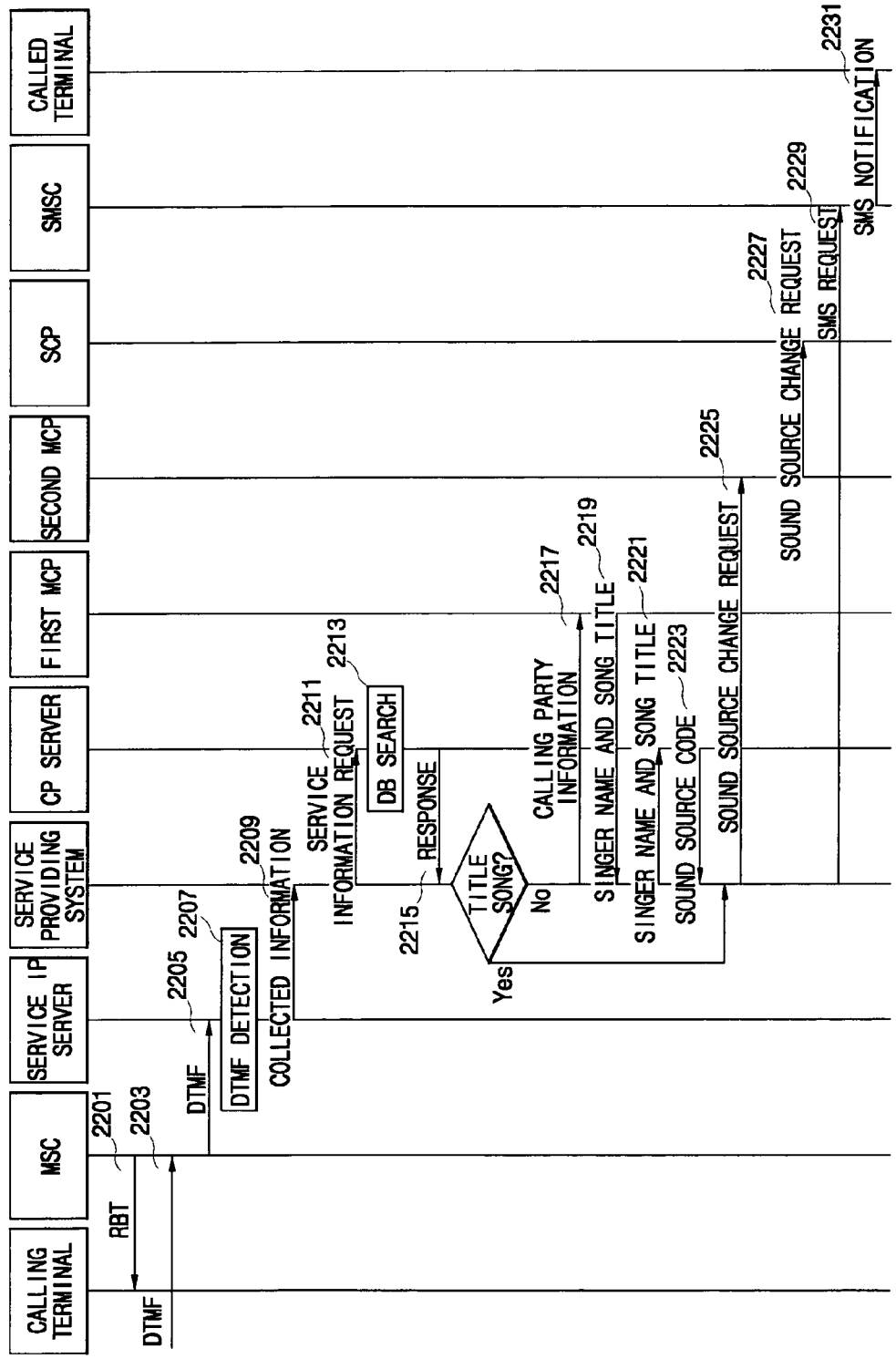
FIG. 22 is a signal flowchart showing the sound source push service according to a second embodiment of the present invention.
Figure 23:
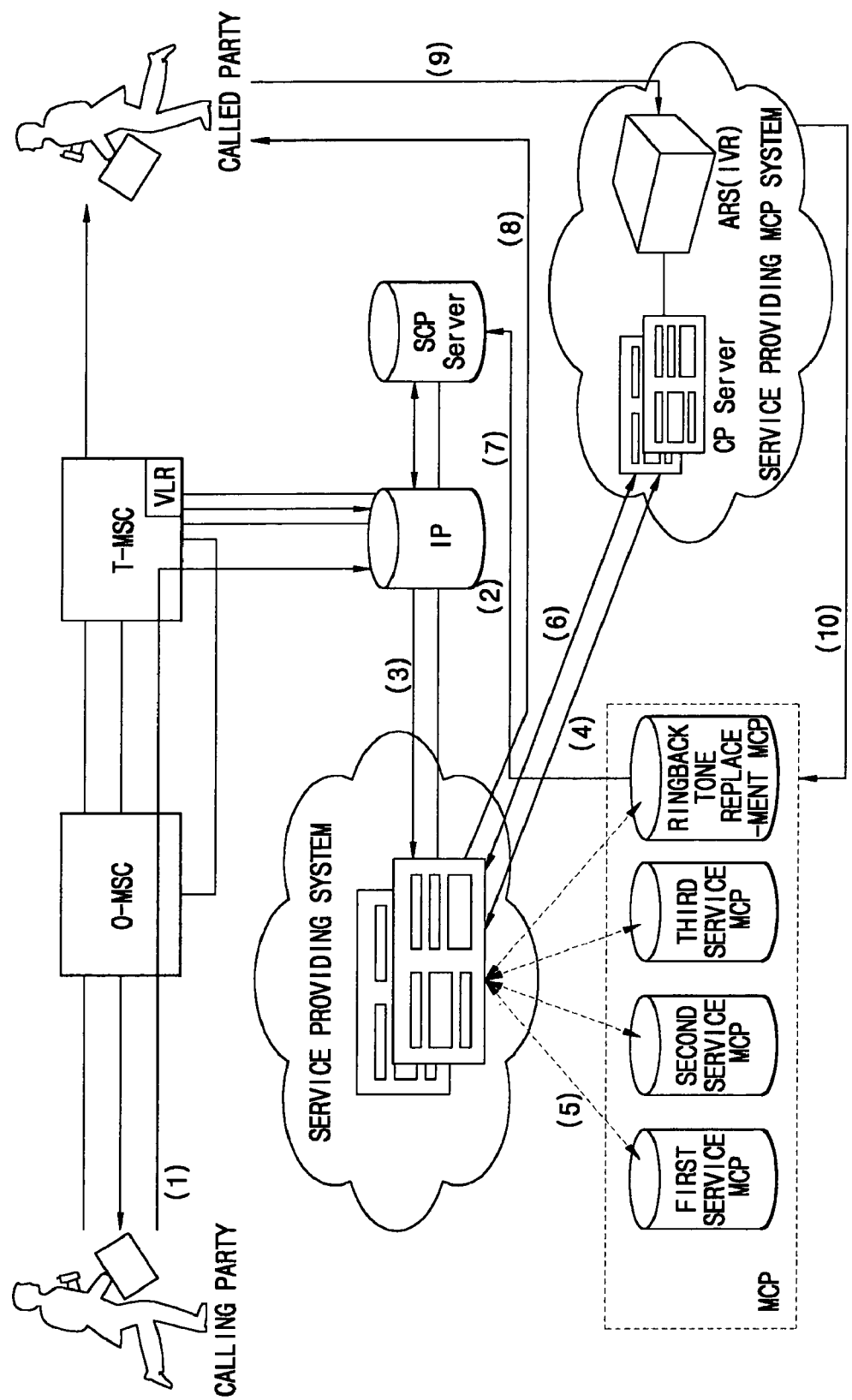
FIG. 23 is a diagram showing the sound source push service according to a second embodiment of the present invention.

FIG. 22 is a signal flowchart showing the sound source push service according to a second embodiment of the present invention. FIG. 23 is a diagram showing the sound source push service according to a second embodiment of the present invention. For reference, numerals are expressed in FIG. 23 for ease of understanding of the present invention.

Referring to FIGS. 22 and 23, if a calling party places a call to a called party having subscribed to a ring back tone replacement service, the called party receives a ring back tone replacing sound depending on a ring back tone replacement service scenario at step 2201. At this time, the calling party presses a DTMF shortcut key for a service sound source on a calling terminal in the case where the calling party desires to push at least one of his or her preset supplementary service sound sources as at least one supplementary service sound source of the called party at step 2203. For example, service sound source shortcut keys includes a shortcut key "1+*" used to push a ring back tone replacing sound, a shortcut key "2+*" used to push a background music sound source, a shortcut key "3+*" used to push a ringer sound source, a shortcut key "4+*" used to push a music mail sound source, a shortcut key "5+*" used to push a MOD sound source, and a shortcut key "6+*" used to push a VOD sound source.

If the shortcut key for the service sound source is input from the calling terminal, the service IP server receives the service sound source shortcut key from the MSC at step 2205. Further, the service IP server detects a specific DTMF signal used as the service sound source shortcut key at step 2207. Thereafter, the service IP server transmits information on a calling party phone number (calling party MIN), a called party phone number (called party MIN), a ring back tone replacing sound code and a DTMF shortcut key, which the service IP server collects for a current ring back tone replacement service, to the service providing system at step 2209. In this case, the service providing system includes a gateway G/W as a service providing apparatus according to the second embodiment of the present invention.

The service providing system requests the title song information and sound source push service information of the calling party from the CP server interworking with the service providing system to provide the present service at step 2211. In response to the request, the CP server searches a database at step 2213. Thereafter, if the title song exists in the database, the CP server transmits a response signal, including the sound source information of the title song, to the service providing system at step 2215.

If the title song of the calling party does not exist in the database at step 2213, the CP server transmits a response signal, indicating that the title song is not registered in the database, to the service providing system at step 2215. The service providing system, having confirmed that the title song of the calling party is not registered, transmits calling party information to a first MCP that provides a supplementary service selected using a DTMF shortcut key by the calling party (hereinafter referred to as a "first supplementary service"), and then receives the name of a singer and the title of a song corresponding to the sound source of the first supplementary service from the first MCP at step 2219. Thereafter, the service providing system requests from the CP server a sound source code corresponding to the name of the singer and the title of the song, to be used for the supplementary service of the called party (hereinafter referred to as a "second supplementary service"), which is selected using the DTMF shortcut key, at step 2221. At this time, a service registration request signal for allowing the called party, who is an object to the sound source push service, to automatically subscribe to the service is transmitted to the CP server together with the sound source code request signal (refer to FIG. 18). In response to the request from the service providing system, the CP server transmits the sound source code to the service providing system at step 2223. In this case, the sound source code is extracted from a mapping table formed to allow sound source codes, singer names and song titles for various supplementary services, provided from a plurality of MCPs, to refer to each other.

Next, the service providing system transmits a sound source setting/change request signal to a second MCP that provides a second supplementary service at step 2225. The sound source change request signal includes the sound source information of the title song of the calling party, or the sound source code of the first supplementary service and called party information, such as a called terminal identifier. At this time, if the second supplementary service is a ring back tone replacement service or background music service, the second MCP transmits the sound source change request signal to the SCP at step 2227. Thereafter, the service providing system notifies the called terminal that the first supplementary service sound source is pushed as a second supplementary service sound source using SMS of the SMSC at steps 2229 and 2231. Through the above process, the calling party conveniently pushes his or her supplementary service sound source as the supplementary service sound source of the called party and then sets the supplementary service sound source of the called party using a DTMF shortcut key during the placing of a call. Meanwhile, in this embodiment, the called party accesses the CP ARS connected to the CP server to listen to a sound source, confirm sound source information and change the sound source, and to newly subscribe to the present service and change subscription information. If the called party changes a sound source, the sound source change information thereof is transmitted to a corresponding MCP.

Figure 24:
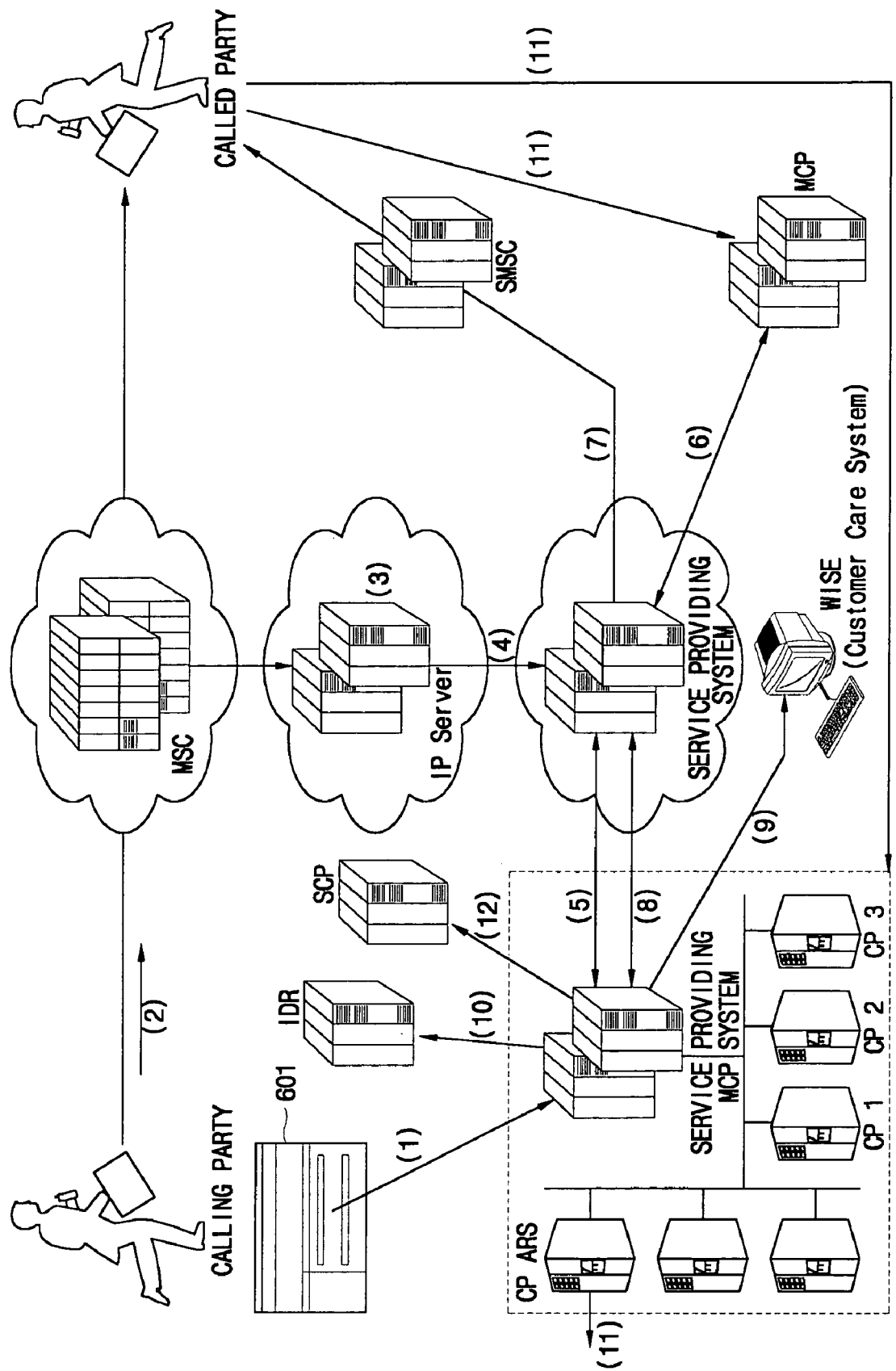
FIG. 24 is a view schematically showing a process of providing the sound source push service according to a second embodiment of the present invention.

FIG. 24 is a view schematically showing a procedure of providing the sound source push service according to a second embodiment of the present invention. In FIG. 24, numerals are expressed for ease of understanding of the present invention.

Referring to FIG. 24, the calling party subscribes to the sound source push service at the CP server of the present invention-in this case, the CP server includes the service providing MCP system-through the wired/wireless Internet, such as Web or WAP (ME), or ARS, and sets the sound source of his or her sound source push service to at least one title song (1). If the calling party does not set the title song, the ring back tone replacing sound of the calling party or a basic sound source provided from a service provider can be used as the sound source of the present service. Next, the calling party presses a DTMF shortcut key on a calling terminal so as to push the title song in the sound source push service, set by the calling party, or a specific supplementary service sound source (hereinafter referred to as a "first service sound source") as at least one supplementary service sound source of the called party (hereinafter referred to as a "second service sound source") in real time using a DTMF shortcut key while listening to the ring back tone replacing sound at the time of placing a call (2). The supplementary service sound source of the calling or called party includes a ring back tone replacing sound source, a ringer sound source, a background music sound source, a music mail sound source, a morning call sound source and a MOD/VOD sound source.

Next, the IP server (service IP server), providing the sound source push service according to the second embodiment of the present invention, receives a DTMF shortcut key from a MSC. Further, the service IP server detects an intelligent network service call from the DTMF shortcut key received from the MSC (DTMF detection)(3). Thereafter, the service IP server transmits collected information, including the phone number information of calling and called terminals, the ring back tone replacing sound source information of the called party and the DTMF shortcut key information, to the service providing system (4). In detail, the collected information includes the subscriber information (calling number and called number), the DTMF shortcut key information and the ring back tone replacing sound source code.

Next, the service providing system requests the sound source information of the first service sound source from the CP server using the data received from the IP server and receives a response signal to the request (5). Further, the service providing system transmits a sound source change request signal to a MCP having the second service sound source (6). Thereafter, the service providing system notifies the called party of the sound source information pushed by the calling party in the form of an SMS message through the SMSC (7). At this time, the SMS message includes the details of the sound source push service used by the calling party and a callback number to the CP ARS, or a callback URL to the Web/WAP (ME) server.

Next, the service providing system transmits a completion message, indicating that the notification message for the results of the sound source push service has been transmitted to the called terminal, to the CP server (8). The CP server performs an automatic subscription procedure for the present service with respect to the called party through the WISE (CS) (9). Such a subscription procedure is performed in the case where the called party does not subscribe to the present service. Further, the CP server transmits the details of the use of the sound source push service to the Internet Detain record (IDR) system so as to bill the calling party for the sound source push service (10).

In the meantime, the called party accesses a corresponding service MCP system using a callback number to the CP ARS or Web/WAP (ME) callback URL included in the SMS message (11). At this time, if the supplementary service of the called party is a ringer download service, the called party accesses a ringer MCP using the callback URL. Further, if the supplementary service of the called party is one of the ring back tone replacement service, the background music service, the music mail service and the MOD/VOD service, the called party may access the CP ARS, and the MCP system providing the corresponding service. Further, the CP server requests the SCP to allow the called party to subscribe to the corresponding service and set a corresponding sound source if the called party is a non-subscriber to the service (12).

Figure 25:
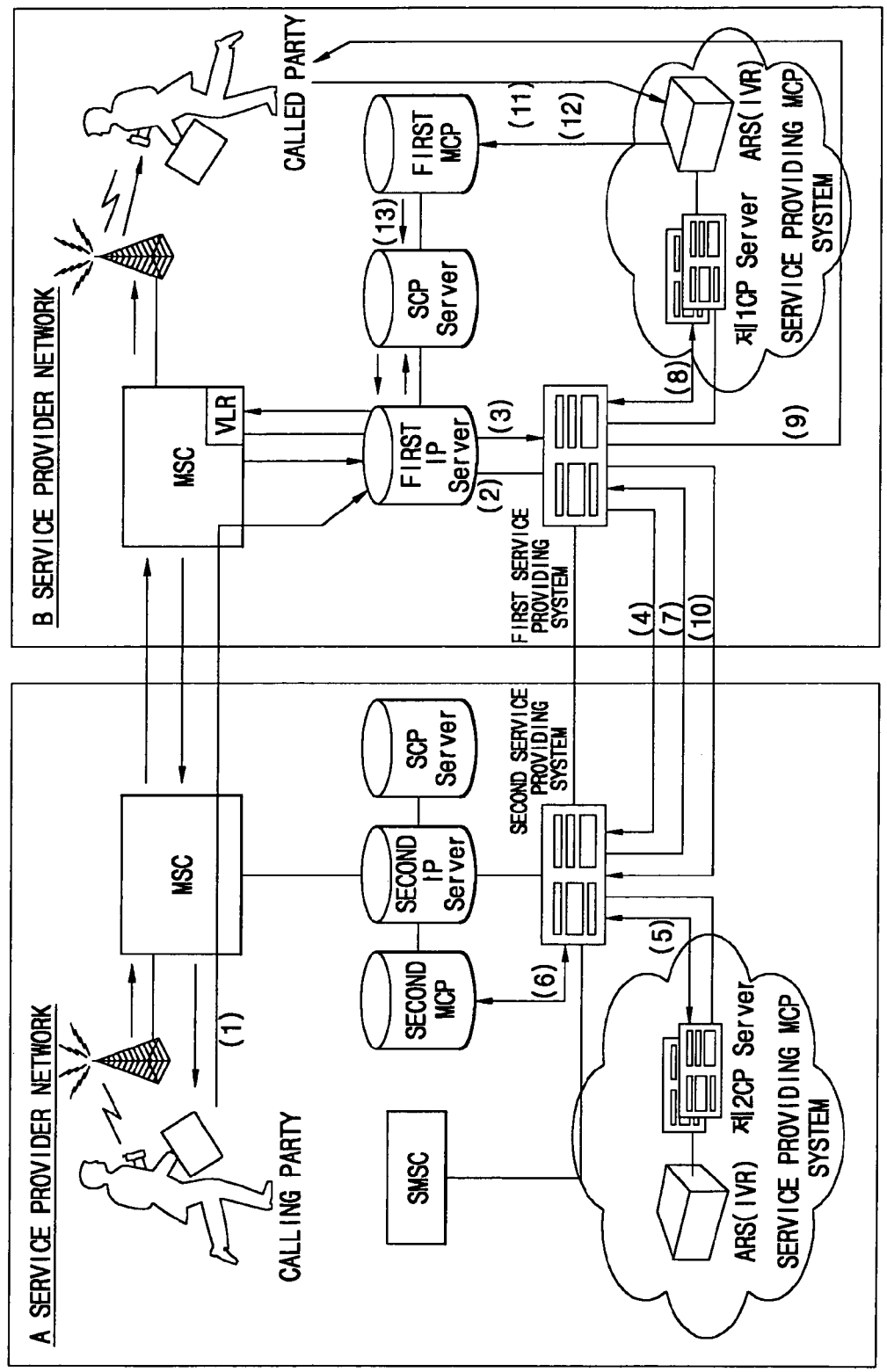
FIG. 25 is a view showing a procedure of allowing a calling party to push at least one supplementary service sound source, preset by the calling party, as at least one supplementary service sound source of a called party, having subscribed to another communication network, through the use of a DTMF shortcut key during the placing of a call using a mobile phone in the sound source push service according to a second embodiment of the present invention.

Next, an interworking procedure between service providers of the sound source push service according to the second embodiment of the present invention is described. That is, if communication network service providers to which the calling party and the called party subscribe are different, the sound source push service of the present invention is performed by interworking between the communication network service providers. FIG. 25 is a view showing a procedure of allowing a calling party to push the sound source of at least one supplementary service (first supplementary service), preset by the calling party, as the sound source of at least one supplementary service (second supplementary service) of a called party having subscribed to another communication network using a DTMF shortcut key during the placing of a call in the sound source push service according to a second embodiment of the present invention. In FIG. 25, numerals are expressed for ease of understanding of the present invention.

Referring to FIG. 25, if a calling party places a call to a called party having subscribed to a ring back tone replacement service, the called party receives a ring back tone replacing sound depending on a ring back tone replacement service scenario. At this time, the calling party presses a service sound source shortcut key (DTMF shortcut key) on a calling terminal so as to push his or her set title song, a specific supplementary service sound source, or a basic sound source provided from the present service provider, as the supplementary service sound source of the called party (1). A first service IP server in a first communication service provider network (B service provider network), to which the called party has subscribed, detects the service sound source shortcut key (DTMF detection) (2). Further, the first service IP server transmits information on a calling party phone number (calling party MIN), a called party phone number (called party MIN), a ring back tone replacing sound code, and a DTMF shortcut key, which the first service IP server collects for a current service, to a first service providing system in the first communication service provider network (3).

Next, the first service providing system transmits data received from the first service IP server to a second service providing system in a second communication service provider network (A service provider network) to which the calling party has subscribed (4). The second service providing system requests and receives the title song information of the calling party from the second CP server in the second communication service provider network (5). At the procedure (5), if the title song of the calling party is not registered, the second service providing system transmits calling party information to the second MCP providing the second supplementary service, and receives the name of a singer and the title of a song corresponding to the sound source of the second supplementary service (6). Further, the second service providing system requests and receives a sound source code corresponding to the singer name and song title from the second CP server. At this time, the second CP server interworks with the first CP server, and extracts the sound source code using a mapping table formed to allow sound source codes, singer names and song titles for various supplementary services, provided from respective MCPs, to refer to each other.

Next, if the title song of the calling party is registered, the second service providing system transmits the sound source information of the title song of the calling party to the first service providing system (7). The first service providing system requests the title song information of the calling party and the registration of the sound source push service from the first CP server in the first communication service provider network, and receives the sound source code corresponding to the title song (8). The first service providing system notifies the called party of the details of the use of the sound source push service using SMS (9). Further, the first service providing system transmits a completion message, indicating that the sound source push service has been completed, to the second service providing system (10).

Thereafter, the called party accesses the ARS connected to the first CP server using the callback number or URL included in the SMS message, and then subscribes to the service and listen to and change the sound source (1). At this time, the subscription of the called party to the service and sound source setting request information thereof is transmitted from the ARS to the MCP, or transmitted to the SCP if necessary (12 and 13).

According to the present invention, a subscriber having subscribed to a service, who is a calling terminal user, can conveniently set the sound source of his or her supplementary service (for example, a ring back tone replacing sound source, a ringer sound source, a Karaoke sound source, a music mail sound source, a background music sound source, and MOD and VOD sound sources) to the ring back tone replacing sound of a called party immediately after listening to the ring back tone replacing sound of the called party at the time of attempting each call on-line.

Further, according to the present invention, the calling party can gift his or her set sound source (title song) or ring back tone replacing sound to an opposite party (called party) as the sound source of a plurality of supplementary services thereof (a ring back tone replacement service, a background music service, a ringer change service, a Karaoke service, a music mail service, and a MOD/VOD service).

Further, according to the present invention, bi-directional, real-time services are possible during the placing of a call of a calling terminal subscriber, and the calling terminal subscriber can very conveniently use services, such as the change of the sound sources of supplementary services, using DTMF shortcut keys during the placing of a call.

Further, according to the present invention, a non-subscriber, who is a calling terminal user, can subscribe to the service and set his or her supplementary service sound source to the ring back tone replacing sound of the opposite party, immediately after listening to the ring back tone replacing sound of the opposite party at the time of attempting each call on-line. Further, the present invention provides the convenience of allowing the called party given the specific sound source or ring back tone replacing sound of the calling party as a gift to conveniently subscribe to the service and set the sound source.

Further, according to the present invention, a communication service provider network provides convenience in changing sound sources and subscribing to the service to users, thus obtaining subscription fees, monthly-incomings based on new subscription, and high-value added profits based on the setting of sound sources due to the increase of the number of changes of sound sources and new subscriptions.

Further, the present invention provides a service of allowing people inexperienced in on-line environments, such as the Internet, to subscribe to the service and change sound sources by pressing a DTMF key (DTMF shortcut key) during the placing of a call, thus enabling communication network service providers to yield additional profits due to the easy inducement of new subscriptions and the increase of subscribers. Further, the subscribers can frequently change their sound sources, thus enabling communication network service providers, MCPs and CPs to increase additional profits due to the change of sound sources.

Further, according to the present invention, the calling terminal subscriber can push service sound sources set by the calling terminal subscriber through the wired/wireless Internet and ARS (in this case, the service sound sources include the title song or supplementary service sound source of the calling terminal subscriber) to the sound sources of a plurality of supplementary services of the called party (in this case, the supplementary services include a ring back tone replacement service, a background music service, a ringer service, a music mail service, a morning call service, and a MOD/VOD service) in real time using DTMF shortcut keys during the placing of a call. That is, according to the present invention, the calling party can easily and compulsorily set the supplementary service sound source of the called party to the supplementary service sound source of the calling party using the DTMF shortcut keys during the placing of a call, thus providing convenience and simplicity in the change of supplementary service sound sources.

According to the present invention, even in the case of a user who does not subscribe to the service yet, a calling party automatically subscribes to the sound source push service by pressing shortcut keys for service sound sources during the placing of a call, so that a procedure of subscribing to the service is greatly simplified.

Further, according to the present invention, a communication network service provider provides to users the convenience of service subscription procedure and an opportunity to make changes of various supplementary service sound sources from existing sound sources to other sound sources, thus yielding subscription fees, service fees and monthly incomings based on new subscription, and high value-added profits based on the setting of sound sources due to the increase of the number of changes and the increase of new subscriptions.

Moreover, the present invention provides a service of allowing people inexperienced in on-line environments, such as the Internet, to subscribe to the service and set/change sound sources by pressing a specific shortcut key on a telephone terminal during the placing of a call, thus enabling communication network service providers to yield additional profits due to the easy inducement of new subscriptions and the increase of subscribers, and enabling the communication network service providers, MCPs and CPs to increase additional profits due to the change of sound sources because the subscribers can frequently change sound sources.

The present invention is not limited to the above embodiments, but various modifications are possible by those skilled in the art, without departing from the scope and spirit of the invention.

What is claimed is:

1. A method of providing a sound source change service, which changes a sound source of at least one supplementary service of a calling party using a sound source of a ring back tone replacing sound of a called party during placing of a call, in a service providing system connected to a Mobile Switching Center (MSC) managing at least one calling terminal and at least one called terminal through a mobile communication network, a service IP server and a Contents Provider (CP) server, comprising:
 detecting a DTMF shortcut key signal received from the calling terminal through the service IP server during the placing of a call using the calling terminal;

receiving collected information from the service IP server in response to the DTMF shortcut key signal;

processing the collected information in a predetermined form;

transmitting a ring back tone replacing sound code included in the collected information to the CP server on the basis of the processed information, the CP server extracting a sound source code of the supplementary service corresponding to the ring back tone replacing sound code using a mapping table formed to allow a plurality of sound source codes, provided from at least a first Master Contents Provider (MCP) and a second MCP that provides the supplementary service to the calling party, and names of singers and titles of songs corresponding to the plurality of sound source codes to refer to each other;

receiving the sound source code from the CP server; and transmitting a sound source change request signal including calling party information, included in the collected information, and the sound source code to the second MCP.

2. The sound source change service providing method according to claim 1, wherein the service IP server is placed in the MSC.

3. The sound source change service providing method according to claim 1, wherein the service IP server is placed in the service providing system.

4. The sound source change service providing method according to claim 1, wherein the collected information includes subscriber information, including a calling terminal identifier and a called terminal identifier corresponding to the called terminal, a sound source code including MCP identification (ID) and serial number corresponding to the first MCP, and the DTMF shortcut key information.

5. The sound source change service providing method according to claim 1, further comprising the second MCP transmitting a sound source change request signal to a Service Control Point (SCP) when the supplementary service sound source is a ring back tone replacing sound source or a ring back tone sound source.

6. The sound source change service providing method according to claim 1, further comprising:

notifying the calling terminal of change results for the supplementary service sound source using a short message through a Short Message Service Center (SMSC); and the calling terminal accessing an ARS server or a Web/Wireless Application Protocol (WAP)/Mobile Explorer (ME) server using a callback number to the ARS server or a callback URL to the Web/WAP (ME) server, included in the short message.

7. The sound source change service providing method according to claim 1, wherein the mapping table includes a database formed to allow a plurality of sound source codes for supplementary services, provided from the first and second MCPs, and names of singers and titles of songs corresponding to the plurality of sound source codes to refer to each other.

8. A method of providing a sound source change service, which changes a sound source of at least one supplementary service of a calling party using a sound source of a ring back tone replacing sound of a called party during placing of a call, in a service providing system connected to a Mobile Switching Center (MSC) managing at least one calling terminal and at least one called terminal through a mobile communication network, a service IP server and a Contents Provider (CP) server, comprising:

detecting a DTMF shortcut key signal received from the calling terminal through the service IP server during the placing of a call using the calling terminal;

receiving collected information from the service IP server in response to the DTMF shortcut key signal;

processing DTMF shortcut key information, included in the collected information;

transmitting a ring back tone replacing sound code included in the collected information to a first Master Contents Provider (MCP) that provides the ring back tone replacing sound of the called party on the basis of the processed information;

receiving sound source information corresponding to the ring back tone replacing sound code from the first MCP;

transmitting the sound source information to the CP server, the CP server extracting a sound source code of the supplementary service corresponding to the sound source information using a mapping table;

receiving the sound source code from the CP server; and transmitting a sound source change request signal including calling party information, included in the collected information, and the sound source code, to a second MCP that provides the supplementary service.

9. A method of providing a sound source change service, which changes a sound source of at least one supplementary service of a calling party using a sound source of a ring back tone replacing sound of a called party during placing of a call, in a plurality of service providing systems each connected to at least one Mobile Switching Center (MSC) managing at least one calling terminal and at least one called terminal through a mobile communication network, at least one service IP server and at least one Contents Provider (CP) server, the service providing systems interworking with each other, comprising:

detecting a DTMF shortcut key signal received from the calling terminal through a first service IP server in a first communication service provider network to which a called terminal subscriber subscribes during the placing of a call using the calling terminal;

a first service providing system in the first communication service provider network receiving collected information from the first service IP server in response to the DTMF shortcut key signal;

processing the collected information in a predetermined form;

transmitting a ring back tone replacing sound code, included in the collected information, to a first MCP that provides the ring back tone replacing sound to the called party, on the basis of the processed information;

receiving first sound source information corresponding to the ring back tone replacing sound code from the first MCP;

the first service providing system transmitting the first sound source information to a second service providing system in a second communication service provider network to which a calling terminal subscriber subscribes;

transmitting the first sound source information to a CP server in the second communication service provider network, the CP server extracting a sound source code of the supplementary service, corresponding to the first sound source information, using a mapping table formed to allow a plurality of pieces of sound source code information for the supplementary service of the calling party, and name information of a plurality of singers and title information of a plurality of songs corresponding to the sound source code information to refer to each other;

receiving the sound source code from the CP server; and transmitting a sound source change request signal including calling party information, included in the collected information, and the sound source code to a second MCP that provides the supplementary service in the second communication service provider network.

10. The sound source change service providing method according to claim 9, further comprising:

the second service providing system transmitting the calling party information and the first sound source information to a third MCP in the second communication service provider network interworking with the first MCP;

receiving second sound source information, which corresponds to the first sound source information and is usable in the second communication service provider network, from the third MCP; and transmitting the second sound source information to the CP server so as to obtain the sound source code corresponding to the second sound source information.

11. A service providing apparatus for providing a sound source change service, which is coupled to a Mobile Switching Center (MSC) managing at least one calling terminal and at least one called terminal through a mobile communication network, a service IP server and a contents provider (CP) server and adapted to provide the sound source change service, which comprises a first service of changing a sound source of at least one supplementary service of a calling party using a sound source of a ring back tone replacing sound of a called party during placing of a call and a second service of changing a sound source of at least one supplementary service of the called party using a specific sound source of the calling party during the placing of a call, comprising:

a DTMF signal detecting unit detecting a DTMF shortcut key signal received from the calling terminal through the service IP server during the placing of a call using the calling terminal;

a collected information processing unit processing collected information, received from the service IP server, in a predetermined form;

a data transmitting/receiving unit receiving the collected information from the service IP server in response to the DTMF shortcut key signal, transmitting a sound source information request signal adapted to request sound source information for the first supplementary service to a first MCP that provides the first supplementary service, receiving the sound source information from the first MCP, transmitting the sound source information to the CP server, receiving a sound source code from the CP server, and transmitting a sound source change request signal to a second MCP that provides the second supplementary service; and a control unit storing the processed information in a database, reading the processed information in a First-In First-Out (FIFO) manner, sequentially transmitting the read information to the first MCP, and controlling the DTMF signal detecting unit, the collected information processing unit and the data transmitting/receiving unit.

12. A method of providing a sound source push service, which pushes a sound source of at least one first supplementary service, set to correspond to at least one calling terminal, as a sound source of at least one second supplementary service, set to correspond to at least one called terminal, during placing of a call, in a service providing system coupled to a Mobile Switching Center (MSC) managing the calling terminal and the called terminal through a mobile communication network, a service IP server and a contents provider (CP) server, comprising:

detecting a DTMF shortcut key signal received from the calling terminal through the service IP server during the placing of a call by the calling terminal;

receiving collected information from the service IP server in response to the DTMF shortcut key signal;

processing the collected information in a predetermined form;

transmitting a sound source information request signal, adapted to request sound source information for the first supplementary service, to a first MCP that provides the first supplementary service on the basis of the processed information, the sound source information request signal including a calling terminal identifier corresponding to the calling terminal;

receiving the sound source information from the first MCP;

transmitting the sound source information to the CP server, the CP server extracting a sound source code corresponding to the sound source information using a mapping table;

receiving the sound source code from the CP server;

transmitting a sound source change request signal including called party information, included in the collected information, and the sound source code to a second MCP that provides the second supplementary service.

13. The sound source push service providing method according to claim 12, wherein the CP server, the first MCP and the second MCP are included in a single contents provider.

14. The sound source push service providing method according to claim 12, further comprising the second MCP transmitting a sound source change request signal to a Service Control Point (SCP) when the second supplementary service is a ring back tone replacement service or a ring back tone service.

15. The sound source push service providing method according to claim 12, further comprising notifying the called terminal of sound source change results for the second supplementary service.

16. A method of providing a sound source push service, which pushes a sound source of at least one first supplementary service, set to correspond to at least one calling terminal, as a sound source of at least one second supplementary service, set to correspond to at least one called terminal, during placing of a call, in a plurality of service providing systems each connected to a Mobile Switching Center (MSC) managing the calling terminal and the called terminal through a mobile communication network, a service IP server and a contents provider (CP) server, comprising:

detecting a DTMF shortcut key signal received from the calling terminal through a first service IP server in a first communication service provider network to which a calling terminal subscribes during the placing of a call using the calling terminal;

a first service providing system in the first communication service provider network receiving collected information from the first service IP server in response to the DTMF shortcut key signal;

processing the collected information in a predetermined form;

transmitting a first sound source information request signal, adapted to request first sound source information for the first supplementary service, to a first MCP that provides the first supplementary service, on the basis of the processed information, the first sound source information request signal including a calling terminal identifier corresponding to the calling terminal;

receiving the first sound source information from the first MCP;

the first service providing system transmitting the first sound source information to a second service providing system in a second communication service provider network to which the called terminal subscribes;

the second service providing system transmitting the first sound source information to a CP server in the second communication service provider network, the CP server extracting a sound source code corresponding to the first sound source information using a mapping table;

receiving the sound source code from the CP server; and transmitting a sound source change request signal including called party information, included in the collected information, and the sound source code to a second MCP that provides the second supplementary service in the second communication service provider network.

17. A service providing apparatus, which is connected to a Mobile Switching Center (MSC) managing at least one calling terminal and at least one called terminal through a mobile communication network, a service IP server and a contents provider (CP) server, and adapted to provide a sound source push service of pushing a sound source of at least one first supplementary service, set to correspond to the calling terminal, as a sound source of at least one second supplementary service, set to correspond to the called terminal, during placing of a call, comprising:

a DTMF signal detecting unit detecting a DTMF shortcut key signal received from the calling terminal through the service IP server during the placing of a call using the calling terminal;

a collected information processing unit processing collected information received from the service IP server in a predetermined form;

a data transmitting/receiving unit receiving the collected information from the service IP server in response to the DTMF shortcut key signal, transmitting a sound source information request signal adapted to request sound source information for the first supplementary service to a first MCP that provides the first supplementary service on the basis of information processed by the collected information processing unit, receiving the sound source information from the first MCP, transmitting the sound source information to the CP server, receiving a sound source code from the CP server, and transmitting a sound source change request signal to a second MCP that provides the second supplementary service; and a control unit storing the processed information in a database, reading the processed information in a First-In First-Out (FIFO) manner, sequentially transmitting the read information to the first MCP, and controlling the DTMF signal detecting unit, the collected information processing unit and the data transmitting/receiving unit.

* * * * *